United States Patent
Yamazaki

(10) Patent No.: US 8,437,046 B2
(45) Date of Patent: May 7, 2013

(54) IMAGE PROCESSING APPARATUS AND METHOD FOR OUTPUTTING AN IMAGE SUBJECTED TO PSEUDO-HALFTONE PROCESSING

(75) Inventor: Masahito Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 880 days.

(21) Appl. No.: 12/555,294

(22) Filed: Sep. 8, 2009

(65) Prior Publication Data

US 2010/0067058 A1   Mar. 18, 2010

(30) Foreign Application Priority Data

Sep. 12, 2008 (JP) ................................ 2008-235197

(51) Int. Cl.
*G06K 15/00* (2006.01)
*G06K 9/46* (2006.01)
*G03G 13/04* (2006.01)
*G09G 3/28* (2006.01)

(52) U.S. Cl.
USPC ......... 358/3.06; 358/1.9; 358/3.03; 358/3.04; 358/3.05; 358/3.13; 358/3.15; 358/3.2; 358/3.3; 358/534; 358/536; 382/167; 382/237; 382/252; 382/270; 382/299; 347/43; 347/131; 345/596; 345/616; 345/63; 345/72

(58) Field of Classification Search .................. None
See application file for complete search history.

(56) References Cited

U.S. PATENT DOCUMENTS

| | | | | |
|---|---|---|---|---|
| 5,109,282 A * | 4/1992 | Peli | .............................. | 358/3.14 |
| 6,714,320 B1 * | 3/2004 | Nakahara et al. | ............ | 358/3.13 |
| 6,906,825 B1 * | 6/2005 | Nakahara et al. | ............. | 358/1.9 |
| 6,975,431 B1 * | 12/2005 | Sugizaki | ...................... | 358/3.06 |
| 2004/0085553 A1 * | 5/2004 | Couwenhoven et al. | ...... | 358/1.9 |
| 2004/0218221 A1 * | 11/2004 | Hirano et al. | ................ | 358/3.06 |
| 2005/0058476 A1 * | 3/2005 | Murakami | .................... | 399/366 |
| 2006/0098045 A1 * | 5/2006 | Mizutani et al. | ................ | 347/43 |
| 2006/0114513 A1 * | 6/2006 | Ogawa | ......................... | 358/3.13 |
| 2006/0290989 A1 * | 12/2006 | Kobayashi | ................... | 358/3.03 |

FOREIGN PATENT DOCUMENTS

JP    2000-83123    9/2009

* cited by examiner

*Primary Examiner* — Steven Kau
(74) *Attorney, Agent, or Firm* — Fitzpatrick, Cella, Harper & Scinto

(57) ABSTRACT

This presents an image processing apparatus and an image processing method which print and output image data subjected to halftone processing with an appropriate density characteristic. The image processing apparatus generates a halftone image from a multi-value image using a threshold value arrangement, and generates a difference image between the generated halftone image and a second halftone image having the density characteristic different from that of the generated halftone image. The image processing apparatus stores the generated halftone image and the generated difference image. The image processing apparatus determines the density characteristic for printing the second halftone image, when determining to carry out printing with the density characteristic different from that of the stored halftone image, generates a halftone image by combining the stored difference image according to the determined density characteristic and the stored halftone image, and outputs the combined halftone image for printing.

5 Claims, 30 Drawing Sheets

THRESHOLD VALUE ARRANGEMENT OF GAMMA 1.0

| 96 | 127 | 143 | 48 | 20 | 195 | 227 | 163 | 98 | 129 | 145 | 50 | 22 | 197 | 229 | 165 |
|---|---|---|---|---|---|---|---|---|---|---|---|---|---|---|---|
| 0 | 207 | 239 | 175 | 116 | 84 | 68 | 36 | 2 | 209 | 241 | 177 | 118 | 86 | 70 | 38 |
| 16 | 191 | 223 | 159 | 104 | 135 | 151 | 56 | 18 | 193 | 225 | 161 | 106 | 137 | 153 | 58 |
| 112 | 80 | 64 | 32 | 8 | 215 | 247 | 183 | 114 | 82 | 66 | 34 | 10 | 217 | 249 | 185 |
| 108 | 139 | 155 | 60 | 24 | 199 | 231 | 167 | 110 | 141 | 157 | 62 | 26 | 201 | 233 | 169 |
| 12 | 219 | 251 | 187 | 120 | 88 | 72 | 40 | 14 | 221 | 253 | 189 | 122 | 90 | 74 | 42 |
| 28 | 203 | 235 | 171 | 100 | 131 | 147 | 52 | 30 | 205 | 237 | 173 | 102 | 133 | 149 | 54 |
| 124 | 92 | 76 | 44 | 4 | 211 | 243 | 179 | 126 | 94 | 78 | 46 | 6 | 213 | 245 | 181 |
| 99 | 130 | 146 | 51 | 23 | 198 | 230 | 166 | 97 | 128 | 144 | 49 | 21 | 196 | 228 | 164 |
| 3 | 210 | 242 | 178 | 119 | 87 | 71 | 39 | 1 | 208 | 240 | 176 | 117 | 85 | 69 | 37 |
| 19 | 194 | 226 | 162 | 107 | 138 | 154 | 59 | 17 | 192 | 224 | 160 | 105 | 136 | 152 | 57 |
| 115 | 83 | 67 | 35 | 11 | 218 | 250 | 186 | 113 | 81 | 65 | 33 | 9 | 216 | 248 | 184 |
| 111 | 142 | 158 | 63 | 27 | 202 | 234 | 170 | 109 | 140 | 156 | 61 | 25 | 200 | 232 | 168 |
| 15 | 222 | 254 | 190 | 123 | 91 | 75 | 43 | 13 | 220 | 252 | 188 | 121 | 89 | 73 | 41 |
| 31 | 206 | 238 | 174 | 103 | 134 | 150 | 55 | 29 | 204 | 236 | 172 | 101 | 132 | 148 | 53 |
| 127 | 95 | 79 | 47 | 7 | 214 | 246 | 182 | 125 | 93 | 77 | 45 | 5 | 212 | 244 | 180 |

FIG.6A

THRESHOLD VALUE ARRANGEMENT OF GAMMA 1.1

| 105 | 135 | 151 | 56 | 25 | 200 | 229 | 170 | 107 | 137 | 153 | 58 | 27 | 202 | 231 | 172 |
|---|---|---|---|---|---|---|---|---|---|---|---|---|---|---|---|
| 0 | 211 | 240 | 181 | 125 | 93 | 77 | 43 | 3 | 213 | 242 | 183 | 127 | 95 | 79 | 45 |
| 21 | 196 | 226 | 166 | 113 | 143 | 158 | 64 | 23 | 198 | 227 | 168 | 115 | 145 | 160 | 66 |
| 121 | 89 | 73 | 39 | 11 | 218 | 248 | 189 | 123 | 91 | 75 | 41 | 13 | 220 | 249 | 190 |
| 117 | 147 | 162 | 68 | 30 | 203 | 233 | 173 | 119 | 149 | 164 | 71 | 32 | 205 | 235 | 175 |
| 16 | 222 | 251 | 192 | 129 | 97 | 81 | 47 | 18 | 224 | 253 | 194 | 130 | 99 | 83 | 49 |
| 34 | 207 | 237 | 177 | 109 | 139 | 155 | 60 | 36 | 209 | 238 | 179 | 111 | 141 | 156 | 62 |
| 132 | 101 | 85 | 52 | 6 | 215 | 244 | 185 | 134 | 103 | 87 | 54 | 8 | 216 | 246 | 187 |
| 108 | 138 | 154 | 59 | 29 | 203 | 232 | 173 | 106 | 136 | 152 | 57 | 26 | 201 | 230 | 171 |
| 4 | 214 | 243 | 184 | 128 | 96 | 80 | 46 | 2 | 212 | 241 | 182 | 126 | 94 | 78 | 44 |
| 24 | 199 | 228 | 169 | 116 | 146 | 161 | 67 | 22 | 197 | 227 | 167 | 114 | 144 | 159 | 65 |
| 124 | 92 | 76 | 42 | 15 | 221 | 250 | 191 | 122 | 90 | 74 | 40 | 12 | 219 | 249 | 189 |
| 120 | 150 | 165 | 72 | 33 | 206 | 236 | 176 | 118 | 148 | 163 | 69 | 31 | 204 | 234 | 174 |
| 19 | 225 | 254 | 195 | 131 | 100 | 84 | 51 | 17 | 223 | 252 | 193 | 129 | 98 | 82 | 48 |
| 38 | 210 | 239 | 180 | 112 | 142 | 157 | 63 | 35 | 208 | 238 | 178 | 110 | 140 | 155 | 61 |
| 135 | 104 | 88 | 55 | 10 | 217 | 247 | 188 | 133 | 102 | 86 | 53 | 7 | 216 | 245 | 186 |

FIG.6B

PSEUDO-HALFTONE EXPRESSION OF DENSITY 10 BY USE OF THRESHOLD VALUE ARRANGEMENT OF GAMMA 1.0

| 96 | 127 | 143 | 48 | 20 | 195 | 227 | 163 | 98 | 129 | 145 | 50 | 22 | 197 | 229 | 165 |
|---|---|---|---|---|---|---|---|---|---|---|---|---|---|---|---|
| ■ | 207 | 239 | 175 | 116 | 84 | 68 | 36 | ■ | 209 | 241 | 177 | 118 | 86 | 70 | 38 |
| 16 | 191 | 223 | 159 | 104 | 135 | 151 | 56 | 18 | 193 | 225 | 161 | 106 | 137 | 153 | 58 |
| 112 | 80 | 64 | 32 | ■ | 215 | 247 | 183 | 114 | 82 | 66 | 34 | 10 | 217 | 249 | 185 |
| 108 | 139 | 155 | 60 | 24 | 199 | 231 | 167 | 110 | 141 | 157 | 62 | 26 | 201 | 233 | 169 |
| 12 | 219 | 251 | 187 | 120 | 88 | 72 | 40 | 14 | 221 | 253 | 189 | 122 | 90 | 74 | 42 |
| 28 | 203 | 235 | 171 | 100 | 131 | 147 | 52 | 30 | 205 | 237 | 173 | 102 | 133 | 149 | 54 |
| 124 | 92 | 76 | 44 | ■ | 211 | 243 | 179 | 126 | 94 | 78 | 46 | ■ | 213 | 245 | 181 |
| 99 | 130 | 146 | 51 | 23 | 198 | 230 | 166 | 97 | 128 | 144 | 49 | 21 | 196 | 228 | 164 |
| ■ | 210 | 242 | 178 | 119 | 87 | 71 | 39 | ■ | 208 | 240 | 176 | 117 | 85 | 69 | 37 |
| 19 | 194 | 226 | 162 | 107 | 138 | 154 | 59 | 17 | 192 | 224 | 160 | 105 | 136 | 152 | 57 |
| 115 | 83 | 67 | 35 | 11 | 218 | 250 | 186 | 113 | 81 | 65 | 33 | ■ | 216 | 248 | 184 |
| 111 | 142 | 158 | 63 | 27 | 202 | 234 | 170 | 109 | 140 | 156 | 61 | 25 | 200 | 232 | 168 |
| 15 | 222 | 254 | 190 | 123 | 91 | 75 | 43 | 13 | 220 | 252 | 188 | 121 | 89 | 73 | 41 |
| 31 | 206 | 238 | 174 | 103 | 134 | 150 | 55 | 29 | 204 | 236 | 172 | 101 | 132 | 148 | 53 |
| 127 | 95 | 79 | 47 | ■ | 214 | 246 | 182 | 125 | 93 | 77 | 45 | ■ | 212 | 244 | 180 |

FIG.7A

PSEUDO-HALFTONE EXPRESSION OF DENSITY 10 BY USE OF THRESHOLD
VALUE ARRANGEMENT OF GAMMA 1.1

| 105 | 135 | 151 | 56  | 25  | 200 | 229 | 170 | 107 | 137 | 153 | 58  | 27  | 202 | 231 | 172 |
| --- | --- | --- | --- | --- | --- | --- | --- | --- | --- | --- | --- | --- | --- | --- | --- |
| ■   | 211 | 240 | 181 | 125 | 93  | 77  | 43  | ■   | 213 | 242 | 183 | 127 | 95  | 79  | 45  |
| 21  | 196 | 226 | 166 | 113 | 143 | 158 | 64  | 23  | 198 | 227 | 168 | 115 | 145 | 160 | 66  |
| 121 | 89  | 73  | 39  | 11  | 218 | 248 | 189 | 123 | 91  | 75  | 41  | 13  | 220 | 249 | 190 |
| 117 | 147 | 162 | 68  | 30  | 203 | 233 | 173 | 119 | 149 | 164 | 71  | 32  | 205 | 235 | 175 |
| 16  | 222 | 251 | 192 | 129 | 97  | 81  | 47  | 18  | 224 | 253 | 194 | 130 | 99  | 83  | 49  |
| 34  | 207 | 237 | 177 | 109 | 139 | 155 | 60  | 36  | 209 | 238 | 179 | 111 | 141 | 156 | 62  |
| 132 | 101 | 85  | 52  | ■   | 215 | 244 | 185 | 134 | 103 | 87  | 54  | ■   | 216 | 246 | 187 |
| 108 | 138 | 154 | 59  | 29  | 203 | 232 | 173 | 106 | 136 | 152 | 57  | 26  | 201 | 230 | 171 |
| ■   | 214 | 243 | 184 | 128 | 96  | 80  | 46  | ■   | 212 | 241 | 182 | 126 | 94  | 78  | 44  |
| 24  | 199 | 228 | 169 | 116 | 146 | 161 | 67  | 22  | 197 | 227 | 167 | 114 | 144 | 159 | 65  |
| 124 | 92  | 76  | 42  | 15  | 221 | 250 | 191 | 122 | 90  | 74  | 40  | 12  | 219 | 249 | 189 |
| 120 | 150 | 165 | 72  | 33  | 206 | 236 | 176 | 118 | 148 | 163 | 69  | 31  | 204 | 234 | 174 |
| 19  | 225 | 254 | 195 | 131 | 100 | 84  | 51  | 17  | 223 | 252 | 193 | 129 | 98  | 82  | 48  |
| 38  | 210 | 239 | 180 | 112 | 142 | 157 | 63  | 35  | 208 | 238 | 178 | 110 | 140 | 155 | 61  |
| 135 | 104 | 88  | 55  | 10  | 217 | 247 | 188 | 133 | 102 | 86  | 53  | ■   | 216 | 245 | 186 |

FIG.7B

MULTI-THRESHOLD-VALUE ARRANGEMENT OF GAMMA 1.0/1.1

| 96 | 127 | 143 | 48 | 20 | 195 | 227 | 163 | 98 | 129 | 145 | 50 | 22 | 197 | 229 | 165 |
|---|---|---|---|---|---|---|---|---|---|---|---|---|---|---|---|
| 105 | 135 | 151 | 56 | 25 | 200 | 229 | 170 | 107 | 137 | 153 | 58 | 27 | 202 | 231 | 172 |
| 0 | 207 | 239 | 175 | 116 | 84 | 68 | 36 | 2 | 209 | 241 | 177 | 118 | 86 | 70 | 38 |
| 0 | 211 | 240 | 181 | 125 | 93 | 77 | 43 | 3 | 213 | 242 | 183 | 127 | 95 | 79 | 45 |
| 16 | 191 | 223 | 159 | 104 | 135 | 151 | 56 | 18 | 193 | 225 | 161 | 106 | 137 | 153 | 58 |
| 21 | 196 | 226 | 166 | 113 | 143 | 158 | 64 | 23 | 198 | 227 | 168 | 115 | 145 | 160 | 66 |
| 112 | 80 | 64 | 32 | 8 | 215 | 247 | 183 | 114 | 82 | 66 | 34 | 10 | 217 | 249 | 185 |
| 121 | 89 | 73 | 39 | 11 | 218 | 248 | 189 | 123 | 91 | 75 | 41 | 13 | 220 | 249 | 190 |
| 108 | 139 | 155 | 60 | 24 | 199 | 231 | 167 | 110 | 141 | 157 | 62 | 26 | 201 | 233 | 169 |
| 117 | 147 | 162 | 68 | 30 | 203 | 233 | 173 | 119 | 149 | 164 | 71 | 32 | 205 | 235 | 175 |
| 12 | 219 | 251 | 187 | 120 | 88 | 72 | 40 | 14 | 221 | 253 | 189 | 122 | 90 | 74 | 42 |
| 16 | 222 | 251 | 192 | 129 | 97 | 81 | 47 | 18 | 224 | 253 | 194 | 130 | 99 | 83 | 49 |
| 28 | 203 | 235 | 171 | 100 | 131 | 147 | 52 | 30 | 205 | 237 | 173 | 102 | 133 | 149 | 54 |
| 34 | 207 | 237 | 177 | 109 | 139 | 155 | 60 | 36 | 209 | 238 | 179 | 111 | 141 | 156 | 62 |
| 124 | 92 | 76 | 44 | 4 | 211 | 243 | 179 | 126 | 94 | 78 | 46 | 6 | 213 | 245 | 181 |
| 132 | 101 | 85 | 52 | 6 | 215 | 244 | 185 | 134 | 103 | 87 | 54 | 8 | 216 | 246 | 187 |
| 99 | 130 | 146 | 51 | 23 | 198 | 230 | 166 | 97 | 128 | 144 | 49 | 21 | 196 | 228 | 164 |
| 108 | 138 | 154 | 59 | 29 | 203 | 232 | 173 | 106 | 136 | 152 | 57 | 26 | 201 | 230 | 171 |
| 3 | 210 | 242 | 178 | 119 | 87 | 71 | 39 | 1 | 208 | 240 | 176 | 117 | 85 | 69 | 37 |
| 4 | 214 | 243 | 184 | 128 | 96 | 80 | 46 | 2 | 212 | 241 | 182 | 126 | 94 | 78 | 44 |
| 19 | 194 | 226 | 162 | 107 | 138 | 154 | 59 | 17 | 192 | 224 | 160 | 105 | 136 | 152 | 57 |
| 24 | 199 | 228 | 169 | 116 | 146 | 161 | 67 | 22 | 197 | 227 | 167 | 114 | 144 | 159 | 65 |
| 115 | 83 | 67 | 35 | 11 | 218 | 250 | 186 | 113 | 81 | 65 | 33 | 9 | 216 | 248 | 184 |
| 124 | 92 | 76 | 42 | 15 | 221 | 250 | 191 | 122 | 90 | 74 | 40 | 12 | 219 | 249 | 189 |
| 111 | 142 | 158 | 63 | 27 | 202 | 234 | 170 | 109 | 140 | 156 | 61 | 25 | 200 | 232 | 168 |
| 120 | 150 | 165 | 72 | 33 | 206 | 236 | 176 | 118 | 148 | 163 | 69 | 31 | 204 | 234 | 174 |
| 15 | 222 | 254 | 190 | 123 | 91 | 75 | 43 | 13 | 220 | 252 | 188 | 121 | 89 | 73 | 41 |
| 19 | 225 | 254 | 195 | 131 | 100 | 84 | 51 | 17 | 223 | 252 | 193 | 129 | 98 | 82 | 48 |
| 31 | 206 | 238 | 174 | 103 | 134 | 150 | 55 | 29 | 204 | 236 | 172 | 101 | 132 | 148 | 53 |
| 38 | 210 | 239 | 180 | 112 | 142 | 157 | 63 | 35 | 208 | 238 | 178 | 110 | 140 | 155 | 61 |
| 127 | 95 | 79 | 47 | 7 | 214 | 246 | 182 | 125 | 93 | 77 | 45 | 5 | 212 | 244 | 180 |
| 135 | 104 | 88 | 55 | 10 | 217 | 247 | 188 | 133 | 102 | 86 | 53 | 7 | 216 | 245 | 186 |

FIG.14

THRESHOLD VALUE ARRANGEMENT OF GAMMA 1.2

| 113 | 143 | 157 | 63 | 31 | 204 | 231 | 176 | 115 | 144 | 159 | 66 | 33 | 206 | 233 | 177 |
|---|---|---|---|---|---|---|---|---|---|---|---|---|---|---|---|
| 0 | 214 | 241 | 186 | 132 | 101 | 85 | 50 | 4 | 216 | 243 | 188 | 134 | 103 | 87 | 52 |
| 25 | 200 | 228 | 172 | 121 | 150 | 165 | 72 | 28 | 202 | 230 | 174 | 123 | 152 | 167 | 74 |
| 128 | 97 | 81 | 45 | 14 | 221 | 248 | 193 | 130 | 99 | 83 | 48 | 17 | 223 | 250 | 195 |
| 125 | 154 | 168 | 76 | 36 | 207 | 235 | 179 | 127 | 156 | 170 | 78 | 38 | 209 | 236 | 181 |
| 20 | 224 | 251 | 197 | 136 | 105 | 89 | 54 | 23 | 226 | 253 | 199 | 138 | 107 | 91 | 57 |
| 40 | 211 | 238 | 183 | 117 | 146 | 161 | 68 | 43 | 212 | 240 | 184 | 119 | 148 | 163 | 70 |
| 140 | 109 | 93 | 59 | 8 | 218 | 245 | 190 | 142 | 111 | 95 | 61 | 11 | 219 | 246 | 192 |
| 116 | 145 | 160 | 67 | 34 | 206 | 234 | 178 | 114 | 144 | 158 | 65 | 32 | 205 | 232 | 176 |
| 6 | 217 | 244 | 189 | 135 | 104 | 88 | 53 | 3 | 215 | 242 | 187 | 133 | 102 | 86 | 51 |
| 29 | 203 | 230 | 175 | 124 | 153 | 167 | 75 | 27 | 201 | 229 | 173 | 122 | 151 | 166 | 73 |
| 131 | 100 | 84 | 49 | 19 | 224 | 251 | 196 | 129 | 98 | 82 | 46 | 16 | 222 | 249 | 194 |
| 128 | 156 | 171 | 80 | 39 | 210 | 237 | 182 | 126 | 155 | 169 | 77 | 37 | 208 | 236 | 180 |
| 24 | 227 | 254 | 199 | 139 | 108 | 92 | 58 | 21 | 225 | 252 | 198 | 137 | 106 | 90 | 56 |
| 44 | 213 | 241 | 185 | 120 | 149 | 164 | 71 | 42 | 212 | 239 | 184 | 118 | 147 | 162 | 69 |
| 143 | 112 | 96 | 62 | 13 | 220 | 247 | 192 | 141 | 110 | 94 | 60 | 10 | 218 | 246 | 191 |

FIG.16

MULTI-THRESHOLD-VALUE ARRANGEMENT OF GAMMA 1.0/1.1/1.2

| 96 | 127 | 143 | 48 | 20 | 195 | 227 | 163 | 98 | 129 | 145 | 50 | 22 | 197 | 229 | 165 |
|---|---|---|---|---|---|---|---|---|---|---|---|---|---|---|---|
| 105 | 135 | 151 | 56 | 25 | 200 | 229 | 170 | 107 | 137 | 153 | 58 | 27 | 202 | 231 | 172 |
| 113 | 143 | 157 | 63 | 31 | 204 | 231 | 176 | 115 | 144 | 159 | 66 | 33 | 206 | 233 | 177 |
| 0 | 207 | 239 | 175 | 116 | 84 | 68 | 36 | 2 | 209 | 241 | 177 | 118 | 86 | 70 | 38 |
| 0 | 211 | 240 | 181 | 125 | 93 | 77 | 43 | 3 | 213 | 242 | 183 | 127 | 95 | 79 | 45 |
| 0 | 214 | 241 | 186 | 132 | 101 | 85 | 50 | 4 | 216 | 243 | 188 | 134 | 103 | 87 | 52 |
| 16 | 191 | 223 | 159 | 104 | 135 | 151 | 56 | 18 | 193 | 225 | 161 | 106 | 137 | 153 | 58 |
| 21 | 196 | 226 | 166 | 113 | 143 | 158 | 64 | 23 | 198 | 227 | 168 | 115 | 145 | 160 | 66 |
| 25 | 200 | 228 | 172 | 121 | 150 | 165 | 72 | 28 | 202 | 230 | 174 | 123 | 152 | 167 | 74 |
| 112 | 80 | 64 | 32 | 8 | 215 | 247 | 183 | 114 | 82 | 66 | 34 | 10 | 217 | 249 | 185 |
| 121 | 89 | 73 | 39 | 11 | 218 | 248 | 189 | 123 | 91 | 75 | 41 | 13 | 220 | 249 | 190 |
| 128 | 97 | 81 | 45 | 14 | 221 | 248 | 193 | 130 | 99 | 83 | 48 | 17 | 223 | 250 | 195 |
| 108 | 139 | 155 | 60 | 24 | 199 | 231 | 167 | 110 | 141 | 157 | 62 | 26 | 201 | 233 | 169 |
| 117 | 147 | 162 | 68 | 30 | 203 | 233 | 173 | 119 | 149 | 164 | 71 | 32 | 205 | 235 | 175 |
| 125 | 154 | 168 | 76 | 36 | 207 | 235 | 179 | 127 | 156 | 170 | 78 | 38 | 209 | 236 | 181 |
| 12 | 219 | 251 | 187 | 120 | 88 | 72 | 40 | 14 | 221 | 253 | 189 | 122 | 90 | 74 | 42 |
| 16 | 222 | 251 | 192 | 129 | 97 | 81 | 47 | 18 | 224 | 253 | 194 | 130 | 99 | 83 | 49 |
| 20 | 224 | 251 | 197 | 136 | 105 | 89 | 54 | 23 | 226 | 253 | 199 | 138 | 107 | 91 | 57 |
| 28 | 203 | 235 | 171 | 100 | 131 | 147 | 52 | 30 | 205 | 237 | 173 | 102 | 133 | 149 | 54 |
| 34 | 207 | 237 | 177 | 109 | 139 | 155 | 60 | 36 | 209 | 238 | 179 | 111 | 141 | 156 | 62 |
| 40 | 211 | 238 | 183 | 117 | 146 | 161 | 68 | 43 | 212 | 240 | 184 | 119 | 148 | 163 | 70 |
| 124 | 92 | 76 | 44 | 4 | 211 | 243 | 179 | 126 | 94 | 78 | 46 | 6 | 213 | 245 | 181 |
| 132 | 101 | 85 | 52 | 6 | 215 | 244 | 185 | 134 | 103 | 87 | 54 | 8 | 216 | 246 | 187 |
| 140 | 109 | 93 | 59 | 8 | 218 | 245 | 190 | 142 | 111 | 95 | 61 | 11 | 219 | 246 | 192 |
| 99 | 130 | 146 | 51 | 23 | 198 | 230 | 166 | 97 | 128 | 144 | 49 | 21 | 196 | 228 | 164 |
| 108 | 138 | 154 | 59 | 29 | 203 | 232 | 173 | 106 | 136 | 152 | 57 | 26 | 201 | 230 | 171 |
| 116 | 145 | 160 | 67 | 34 | 206 | 234 | 178 | 114 | 144 | 158 | 65 | 32 | 205 | 232 | 176 |
| 3 | 210 | 242 | 178 | 119 | 87 | 71 | 39 | 1 | 208 | 240 | 176 | 117 | 85 | 69 | 37 |
| 4 | 214 | 243 | 184 | 128 | 96 | 80 | 46 | 2 | 212 | 241 | 182 | 126 | 94 | 78 | 44 |
| 6 | 217 | 244 | 189 | 135 | 104 | 88 | 53 | 3 | 215 | 242 | 187 | 133 | 102 | 86 | 51 |
| 19 | 194 | 226 | 162 | 107 | 138 | 154 | 59 | 17 | 192 | 224 | 160 | 105 | 136 | 152 | 57 |
| 24 | 199 | 228 | 169 | 116 | 146 | 161 | 67 | 22 | 197 | 227 | 167 | 114 | 144 | 159 | 65 |
| 29 | 203 | 230 | 175 | 124 | 153 | 167 | 75 | 27 | 201 | 229 | 173 | 122 | 151 | 166 | 73 |
| 115 | 83 | 67 | 35 | 11 | 218 | 250 | 186 | 113 | 81 | 65 | 33 | 9 | 216 | 248 | 184 |
| 124 | 92 | 76 | 42 | 15 | 221 | 250 | 191 | 122 | 90 | 74 | 40 | 12 | 219 | 249 | 189 |
| 131 | 100 | 84 | 49 | 19 | 224 | 251 | 196 | 129 | 98 | 82 | 46 | 16 | 222 | 249 | 194 |
| 111 | 142 | 158 | 63 | 27 | 202 | 234 | 170 | 109 | 140 | 156 | 61 | 25 | 200 | 232 | 168 |
| 120 | 150 | 165 | 72 | 33 | 206 | 236 | 176 | 118 | 148 | 163 | 69 | 31 | 204 | 234 | 174 |
| 128 | 156 | 171 | 80 | 39 | 210 | 237 | 182 | 126 | 155 | 169 | 77 | 37 | 208 | 236 | 180 |
| 15 | 222 | 254 | 190 | 123 | 91 | 75 | 43 | 13 | 220 | 252 | 188 | 121 | 89 | 73 | 41 |
| 19 | 225 | 254 | 195 | 131 | 100 | 84 | 51 | 17 | 223 | 252 | 193 | 129 | 98 | 82 | 48 |
| 24 | 227 | 254 | 199 | 139 | 108 | 92 | 58 | 21 | 225 | 252 | 198 | 137 | 106 | 90 | 56 |
| 31 | 206 | 238 | 174 | 103 | 134 | 150 | 55 | 29 | 204 | 236 | 172 | 101 | 132 | 148 | 53 |
| 38 | 210 | 239 | 180 | 112 | 142 | 157 | 63 | 35 | 208 | 238 | 178 | 110 | 140 | 155 | 61 |
| 44 | 213 | 241 | 185 | 120 | 149 | 164 | 71 | 42 | 212 | 239 | 184 | 118 | 147 | 162 | 69 |
| 127 | 95 | 79 | 47 | 7 | 214 | 246 | 182 | 125 | 93 | 77 | 45 | 5 | 212 | 244 | 180 |
| 135 | 104 | 88 | 55 | 10 | 217 | 247 | 188 | 133 | 102 | 86 | 53 | 7 | 216 | 245 | 186 |
| 143 | 112 | 96 | 62 | 13 | 220 | 247 | 192 | 141 | 110 | 94 | 60 | 10 | 218 | 246 | 191 |

FIG.17

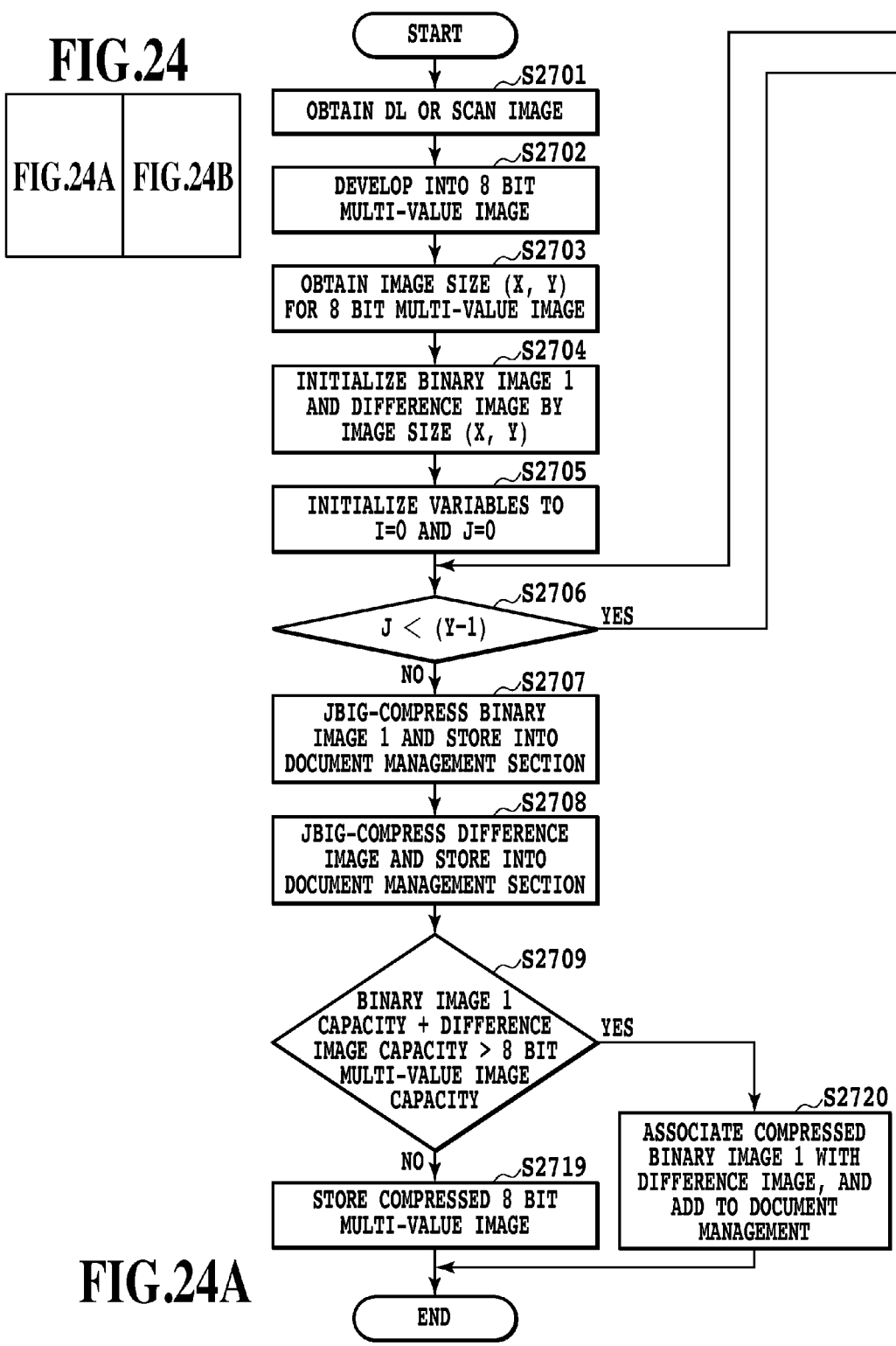

IMAGE PROCESSING APPARATUS AND METHOD FOR OUTPUTTING AN IMAGE SUBJECTED TO PSEUDO-HALFTONE PROCESSING

BACKGROUND OF THE INVENTION

1. Field of the Invention

The present invention relates to an image processing apparatus and an image processing method which have functions of receiving and printing image data.

2. Description of the Related Art

A pseudo-halftone technique is widely used for a printer and a multi-functional machine using ink or toner.

Using the pseudo-halftone technique has an advantage also in the aspect of image data size. In the multi-functional machine having a document box function, a document data size to be stored in a secondary storage unit, such as a hard disk, frequently requires a smaller capacity in the case of storing a binary image subjected to pseudo-halftone processing than in the case of storing a multi-bit multi-value image. Note that the document box function is a function of storing document data in a hard disk for performing sharing and distribution of the data. Further, the smaller data size has an advantage in the aspect of a network load in the case that image data is transmitted and received between the printers or the multi-functional machines connected with each other by a network.

In the case of storing the binary image data, however, the density characteristic of the image is determined at the time when the pseudo-halftone processing is performed, and there has not existed a method in which the density is adjusted afterward.

Japanese Patent Laid-Open No. 2000-83123 discloses a technique related to a binary image data transmission method in which a change in the density characteristic in print output is taken into consideration. This technique obtains a density correction characteristic of a receiving side device before image data is transmitted by a device which transmits the binary image data, and transmits the binary image data after performing the pseudo-halftone processing according to the density characteristic of the receiving side device.

However, even if the technique disclosed by Japanese Patent Laid-Open No. 2000-83123 is used, sometimes the output with the most suitable density is not performed at the time when the receiving side device carries out the print output. This is a case in which the output density characteristic changes because of an engine calibration or the like during a time between receiving and printing of the binary data in the receiving side device.

Further, even for a single printer or within a printing apparatus, there is a case in which a change of the density characteristic is desired afterward for the binary image subjected to the pseudo-half tone processing.

Depending on a configuration of the printing apparatus, a recording paper transfer speed sometimes changes for each paper feeder unit in the printing apparatus. This is a case when paper feed from a manual tray has a low speed while paper feed from a paper feed cassette has a high speed. The density characteristic of the printing apparatus sometimes changes depending on the paper transfer speed in the apparatus. Usually, when papers run out in the paper feed cassette during processing a job having a plurality of pages, for example, the same type paper in the manual tray is supplied by an automatic paper feed selection function, although the paper feed cassette is selected when the printing job processing is started. In this case, there arises a problem that the density characteristic changes during the job because of the difference in the paper transfer speeds.

Further, in the case that a plurality of printing apparatuses connected with each other by a network receives and transmits image data therebetween, the printing apparatuses can receive and transmit the image data therebetween by using a predetermined protocol and image format. Accordingly, the receiving side device can easily transfer the received image data to a third printing apparatus. In this case, the density characteristic is sometimes different between a device performing the pseudo-halftone processing to generate the binary image data and a device finally receiving the image data to print the binary image data.

An object of the present invention is to provide an image processing apparatus and an image processing method which print and output image data subjected to pseudo-halftone processing with an appropriate density characteristic.

SUMMARY OF THE INVENTION

An image processing apparatus according to the present invention includes: a unit performing halftone processing on one multi-value image by using a plurality of different kinds of threshold value arrangements and generating a plurality of halftone images which have different density characteristics; a unit generating a difference image between a first halftone image and a halftone image other than the first halftone image among the plurality of generated halftone images; a unit storing the first halftone image and the generated difference image; a unit determining a density characteristic for printing the halftone image; a unit generating a halftone image, when the unit for determination determines to carry out printing with the density characteristic different from that of the stored first halftone image, by combining the stored difference image according to the determined density characteristic and the stored first halftone image; and a unit outputting the combined and generated halftone image for printing.

According to the present invention, it is possible to provide an image processing apparatus and an image processing method which print and output image data subjected to halftone processing with an appropriate density characteristic.

Further features of the present invention will become apparent from the following description of exemplary embodiments (with reference to the attached drawings).

BRIEF DESCRIPTION OF THE DRAWINGS

FIG. 6A is a diagram showing an example of a dither threshold value arrangement used for pseudo-halftone processing in an embodiment of the present invention;

FIG. 6B is a diagram showing an example of a dither threshold value arrangement used for pseudo-halftone processing in an embodiment of the present invention;

FIG. 7A is a diagram showing an example of pseudo-halftone representation in an embodiment of the present invention;

FIG. 7B is a diagram showing an example of pseudo-halftone representation in an embodiment of the present invention;

FIG. 12 is a diagram showing the relationship of FIGS. 12A and 12B;

FIG. 14 is a diagram showing an example of a dither multi-threshold-value arrangement used for pseudo-halftone processing in an embodiment of the present invention;

FIG. 16 is a diagram showing an example of a dither threshold value arrangement used for pseudo-halftone processing in another embodiment of the present invention;

FIG. 17 is a diagram showing an example of a dither multi-threshold-value arrangement used for pseudo-halftone processing in another embodiment of the present invention;

FIG. 18 is a diagram showing the relationship of FIGS. 18A and 18B;

FIG. 24 is a diagram showing the relationship of FIGS. 24A and 24B;

FIG. 24A is a flowchart showing a processing example of a digital multi-functional machine in another embodiment of the present invention;

DESCRIPTION OF THE EMBODIMENTS

Embodiment 1

Hereinafter, the best mode for implementing the present invention will be described with reference to the drawings.

Figure 1:
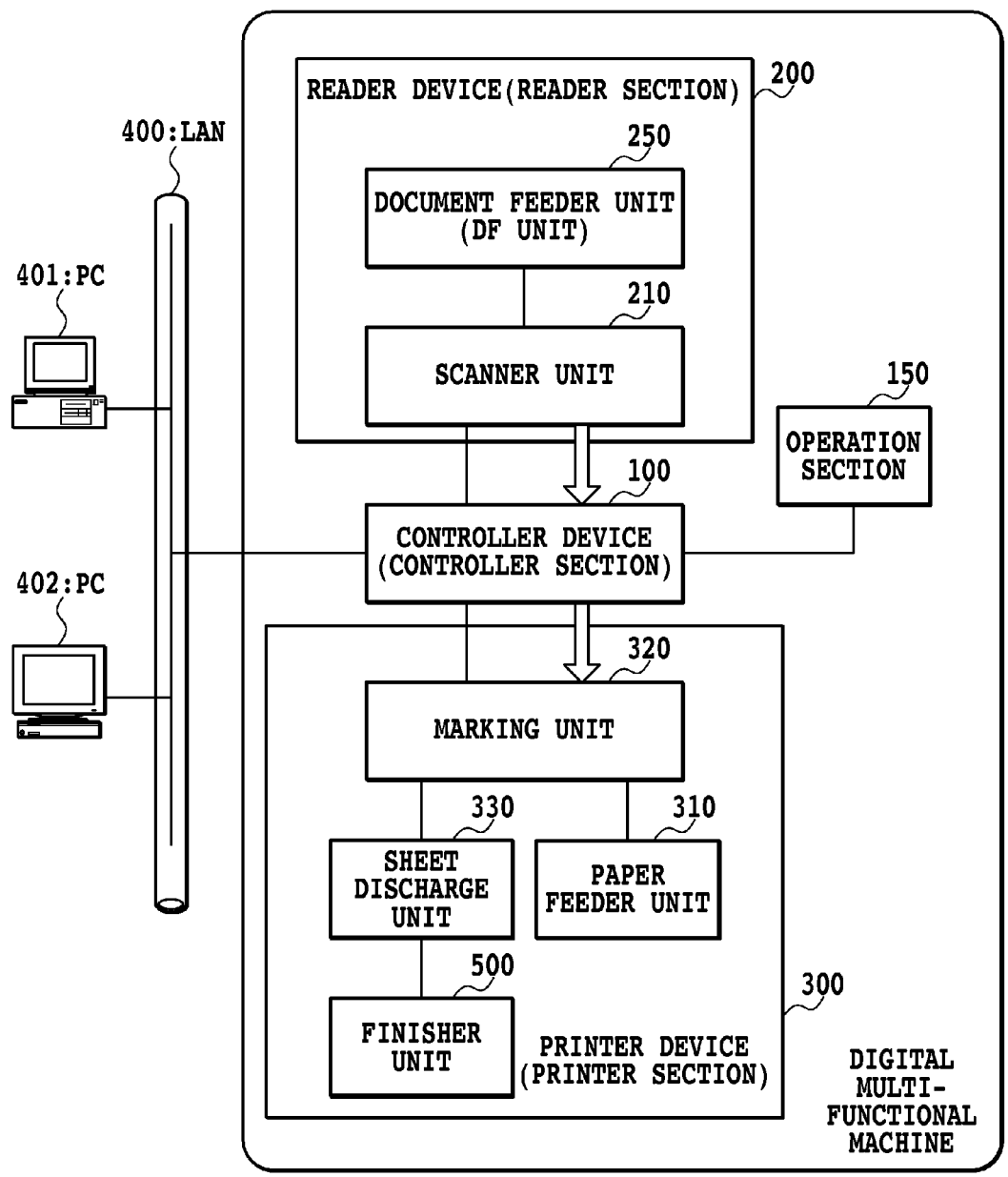
FIG. 1 is a block diagram showing an example of an entire configuration of a digital multi-functional machine in an embodiment of the present invention.

An entire configuration of a digital multi-functional machine will be described as an example of an image processing apparatus preferable for implementing the present invention with reference to FIG. 1.

A reader device (reader section) 200 reads a document image optically and converts it into image data. The reader section 200 includes a scanner unit 210 having a function of reading the document and a document paper feeder unit 250 having a function of feeding the document paper.

A printer device (printer section) 300 feeds a recording paper, prints the image data thereon as a visible image, and discharges the paper to the outside of the device.

The printer section 300 includes a paper feeder unit 310, a marking unit 320, a paper discharge unit 330, and a staple-processing and finisher section 500. The paper feeder unit 310 has cassettes for plural kinds of recording papers on which the image data is printed. The marking unit 320 has a function of transferring and fixing the image data onto the recording paper. The paper discharge unit 330 has a function of outputting the printed recording paper to the outside of the device. The finisher section 500 carries out staple processing, sorting processing, etc.

A controller device (controller section) 100 is electrically connected to the reader section 200 and the printer section 300, and further connected to a host computer (e.g. PC 401 or 402) and various kinds of servers on the Internet via a network 400 such as a LAN.

The controller device 100 controls the reader section 200 to read the document image data and controls the printer section 300 to provide a copying function of outputting the above read image data onto the recording paper.

Further, the controller device 100 provides a scanner function, a printer function, a document box function, and a job control function. The scanner function converts the image data read from the reader section 200 into code data and transmits the code data to the host computer via the network 400. The printer function converts print job data received from the host computer via the network 400 into image data and output the image data to the printer section 300. The document box function stores the image data read from the reader section 200 and the image data converted from the print job data received from the host computer in a secondary storage unit within the controller device 100. The job control function controls a job for the received print job data.

An operation section 150 is connected to the controller device 100 and has a configuration including a liquid crystal touch panel to provide a user I/F for operating an image input/output system.

<Configuration of the Controller Section>

Figure 2:
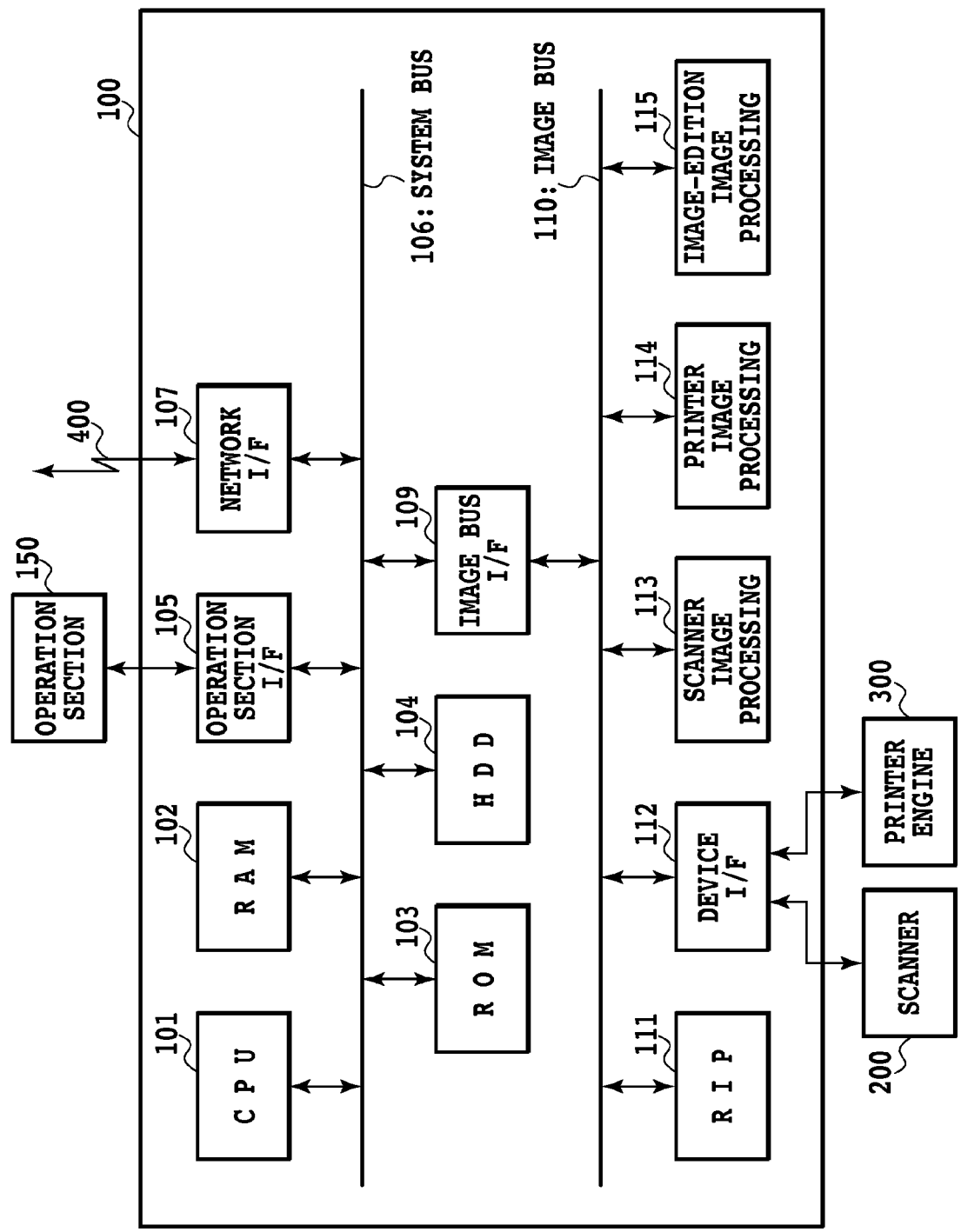
FIG. 2 is a block diagram showing an example of a configuration of a controller section of a digital multi-functional machine in an embodiment of the present invention.

FIG. 2 is a block diagram showing a configuration example of the controller section 100 of the digital multi-functional machine in the present embodiment. In FIG. 2, the controller section 100 is connected to the scanner 200 which is an image input device and the printer engine 300 which is an image output device, and carries out the control of image data reading and print outputting. Further, the controller section 100 is connected to the LAN 400 and thereby carries out the control of inputting and outputting image information or device information via the LAN 400.

A CPU 101 is a central processing unit for controlling the entire digital multi-functional machine. A RAM 102 is a system work memory for the operation of the CPU 101 and also a memory for temporarily storing the input document image data. Further, a ROM 103 is a boot ROM and stores a boot program of the system. An HDD 104 is a hard disk drive and stores a system software program for various kinds of processing, the input image data, etc. An operation I/F 105 is an interface section for the operation section 150 having a display screen which can display the image data or the like, and outputs operation screen data to the operation section 150. Further, the operation I/F 105 has a role of transferring information input by an operator from the operation section 150 to the CPU 101. A network I/F 107 is realized by a LAN card or the like, for example, and is connected to the LAN 400 to carry out inputting and outputting of information from and to an external apparatus. The above units are arranged on a system bus 106.

An image bus I/F 109 is an interface for connecting the system bus 106 to an image bus 110 which transfers the image data in a high speed, and works as a bus bridge converting a data structure. On the image bus 110 are connected a raster image processor 111, a device I/F 112, a scanner image processing section 113, a printer image processing section 114, and an image-edition image processing section 115.

The raster image processor (RIP) 111 develops a page description language (PDL) code and a display list (DL) into images. The device I/F 112 connects the scanner 200 and the printer engine 300 to the controller 100 and carries out synchronous-system/asynchronous-system conversion of the image data.

Further, the scanner image processing section 113 carries out various kinds of processing such as correction, modification, and edition for the image data input from the scanner 200. The printer image processing section 114 performs processing such as correction and resolution conversion according to the printer engine on the image data to be printed for output. The image-edition image processing section 115 carries out various kinds of image processing such as rotation of the image data and compression and decompression of the image data.

<Controller Software Configuration>

Figure 3:
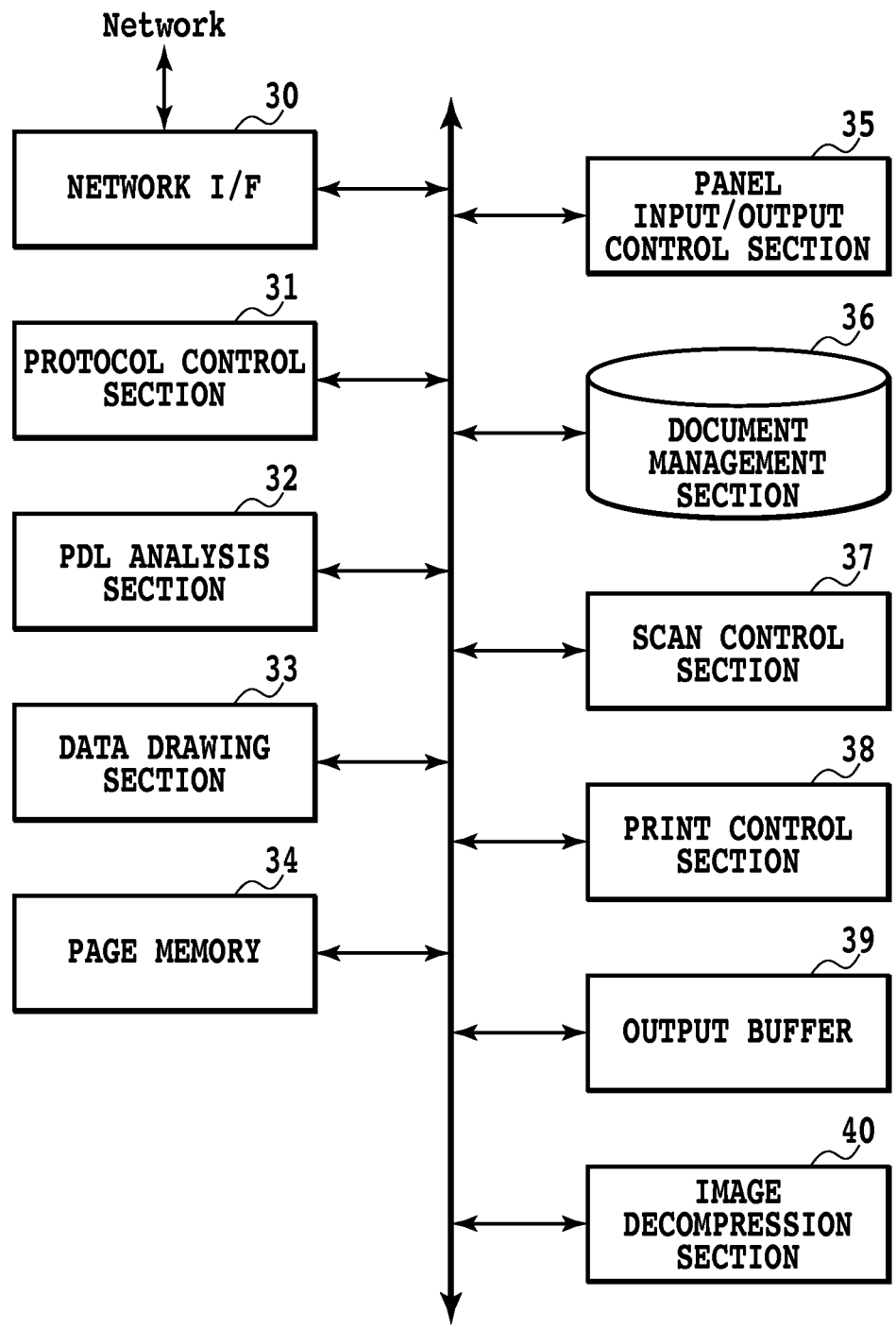
FIG. 3 is a block diagram showing an example of a software configuration of a controller section of a digital multi-functional machine in an embodiment of the present invention.

FIG. 3 is a block diagram showing a configuration of controller software controlling the operation of the digital multi-functional machine. Each function of the software configuration is realized by the program which is stored in the storage section such as the ROM 103 and the HDD 104 is developed in the RAM 102 and executed by the CPU 101.

A network I/F 30 is a unit for inputting and outputting from and to the outside. A protocol control section 31 is a unit for carrying out communication with the outside by analyzing and transmitting a network protocol.

A PDL analysis section 32 is a unit analyzing PDL data received as the document image data and converting the PDL data into an intermediate code (display list) which is easier to process. The PDL data analyzed in the PDL analysis section 32 includes LIPS (registered trade mark), PostScript (registered trademark), etc. Further, the PDL analysis section 32 sometimes receives a file including the image data recorded in the TIFF (registered trade mark) format and extracts the image data from the file to generate the display list. The display list generated in the PDL analysis section 32 is transferred to a data drawing section 33 to be processed. Further, there is a case in which the display list is generated in the host computer 401 and received in a printer interface 30.

The data drawing section 33 develops the above display list into bit map data. A page memory 34 is a unit temporarily storing the bit map data developed by the data drawing section 33, and is realized by a non-volatile memory. Here, the data drawing section 33 draws the multi-value bit map data developed from the display list temporarily in the page memory 34, and further generates binary bit map image data of the (pseudo) halftone image by performing (pseudo) halftone processing. After that, the data drawing section 33 performs data compression on this binary bit map image data and stores the compressed data in a document management section 36.

The document management section 36 is a unit storing a part of or all of the bit map data developed by the data drawing section 33, and is realized by a secondary storage unit such as a hard disk. Further, the document management section 36 also stores scan image data processed in a scan control section which will be described below. The bit map data stored here is compressed in the data size by a method such as JBIG (ITU-T Recommendation T.82). In addition, the document management section 36 also stores various kinds of attributes necessary for the print job execution.

A panel input/output control section 35 controls inputting and outputting from and to the operation panel 150.

The scan control section 37 carries out various kinds of processing such as correction, modification and edition for the image data input from the scanner 200.

An output buffer 39 develops the compressed binary bit map data in the document management section 36 and functions as a buffer area for transferring the binary bit map data to a print control section 38, and is realized by a non-volatile memory.

An image decompression section 40 decompresses the compressed binary bit map data stored in the document management section 36 to develop the decompressed data into the output buffer 39, in synchronization with the operation of the printer engine 300.

The print control section 38 converts the binary bit map data developed in the output buffer 39 into a video signal and carries out image transfer to the printer engine section 300. The printer engine section 300 is a print mechanism section for forming the received video signal onto a recording paper as a permanent visible image. Further, for a setting value of a recording paper transfer speed, the print control section 38 obtains the value which is stored in the storage area of the HDD 104 or the like or the value input into the panel input/output control section 35, and controls the recording paper transfer speed in printing according to the obtained value.

<Image Data Processing>

Next, it will be described how the image data processing is carried out within the controller.

Figure 4:
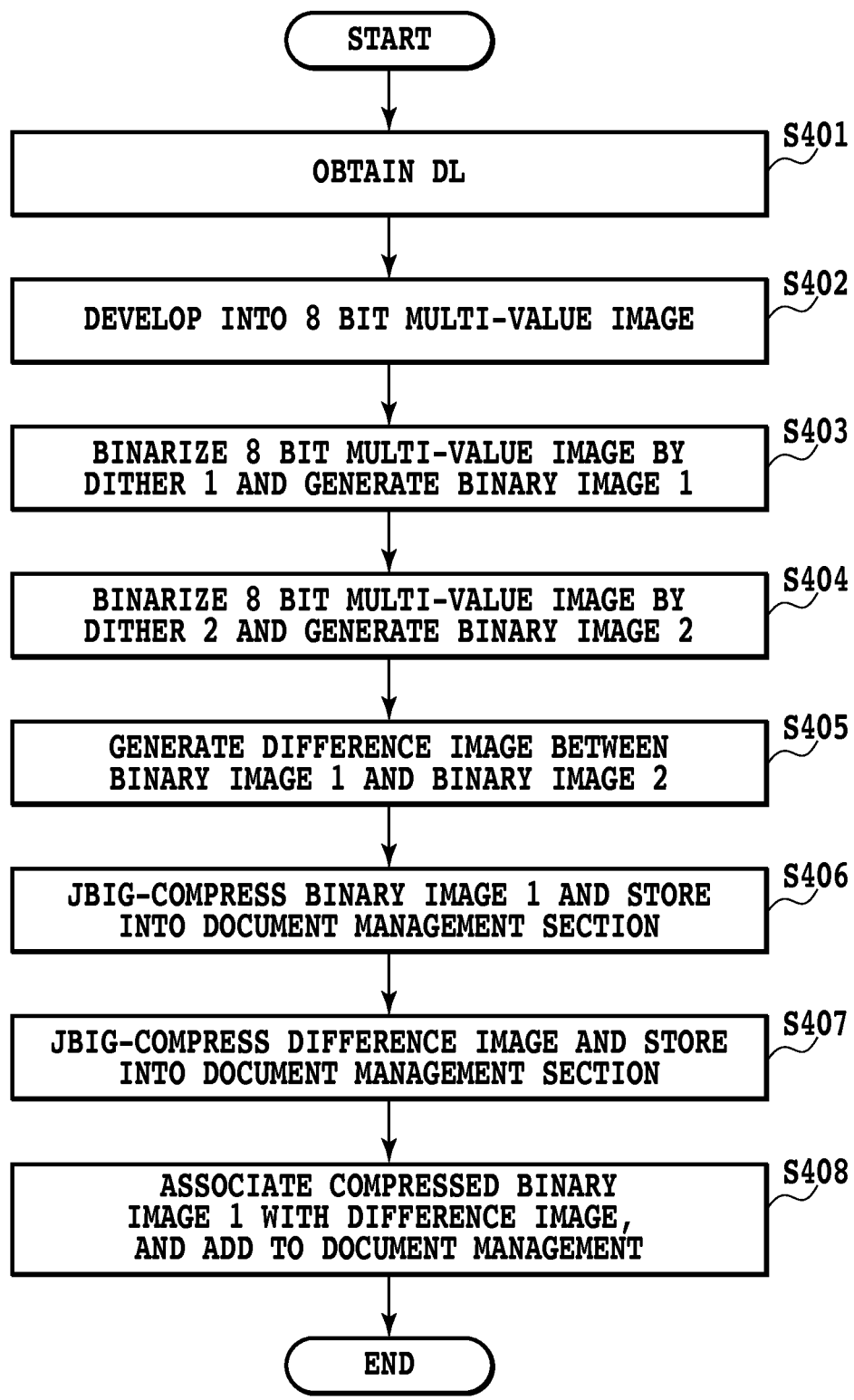
FIG. 4 is a flowchart showing a processing example of a digital multi-functional machine in en embodiment of the present invention.

FIG. 4 is a flowchart showing a processing flow example of the data drawing section 33 in the image data processing operated in the raster image processor (RIP) 111 of the present embodiment.

Figure 5:
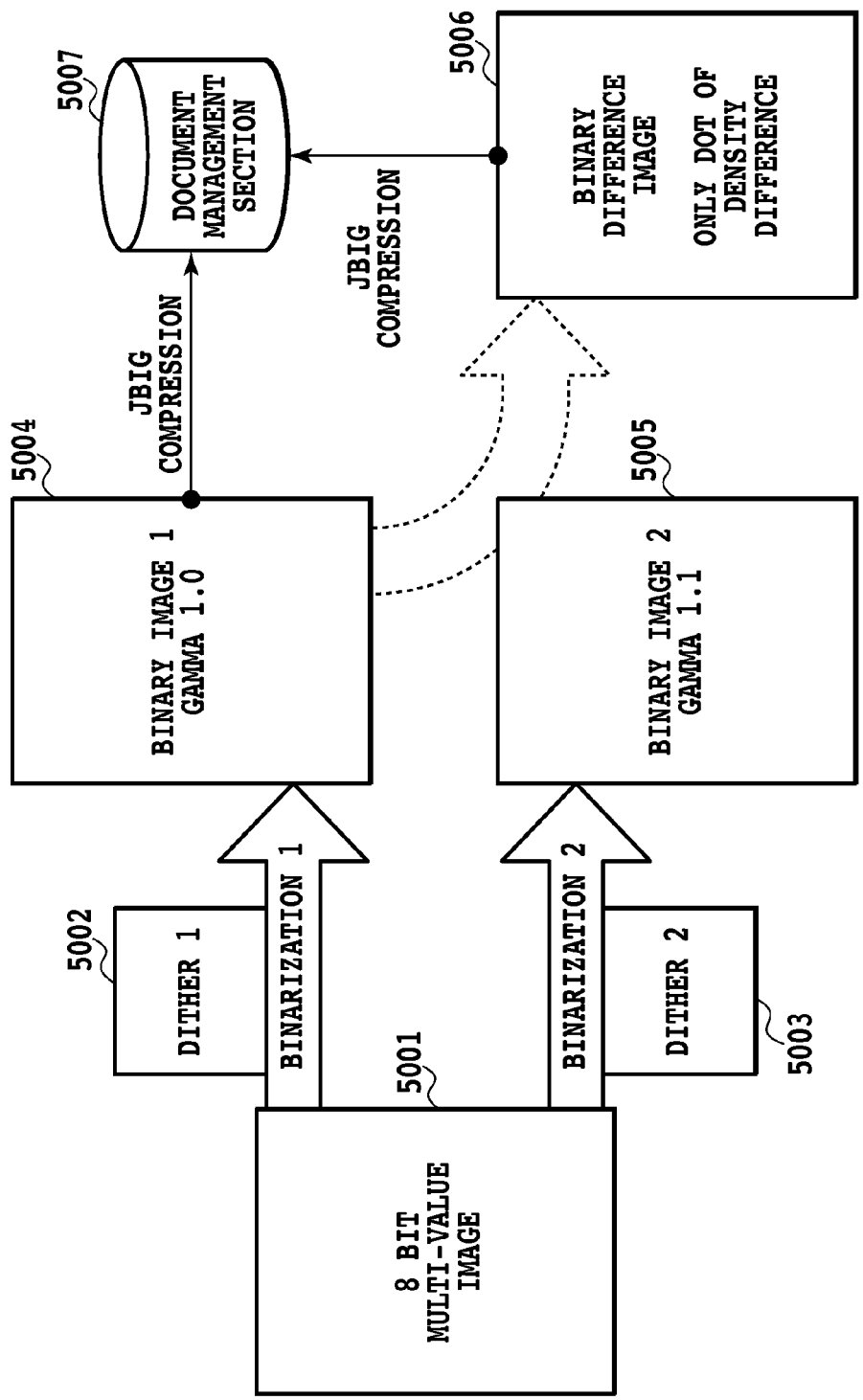
FIG. 5 is a conceptual diagram showing a processing example of a digital multi-functional machine in an embodiment of the present invention.

FIG. 5 is a diagram schematically showing a part of the processing of FIG. 4.

FIG. 6A shows an example of a dither threshold value arrangement of 16×16 which corresponds to a dither (1) 5002 in FIG. 5. This threshold value arrangement is used in the pseudo-halftone processing of an 8 bit multi-value image. The pseudo-halftone processing compares a pixel value at one position in coordinate in the 8 bit multi-value image with a threshold value at the corresponding position in the threshold value arrangement, and sets the pixel value of the coordinate in a binary image to zero when the pixel value is equal to or smaller than the threshold value. When the pixel value is larger than the threshold value, the pixel value at the coordinate in the binary image is set to one. The pseudo-halftone processing using this threshold value arrangement can provide the binary image having a linear density characteristic of gamma 1.0.

FIG. 6B shows an example of the dither threshold value arrangement of 16×16 which corresponds to a dither (2) 5003. This threshold value arrangement, while also being used in the pseudo-halftone processing of the 8 bit multi-value image, has a convex shape threshold value distribution of gamma 1.1 and the obtained binary image gets to have a concave shape density distribution. This is used for the density correction of an input signal when the marking unit 320 in the printer engine 300 has a convex shape output density characteristic for an input density signal.

Hereinafter, the processing carried out by the data drawing section 33 will be described with reference to FIG. 4. The control of the processing is carried out by the CPU 101 which reads out the program stored in the storage area of the HDD 104 or the like to perform the processing shown in FIG. 4 and executes the program.

First, in Step S401, in response to a command received from the CPU 101, the RIP 111 obtains the display list generated by the analysis and conversion in the PDL analysis section 32. This display list includes drawing object information of a character, vector graphics, and a raster image to be drawn.

Next, in Step S402, the RIP 111 generates an 8 bit multi-value image 5001 by rasterizing a drawing object in the obtained display list, and stores the 8 bit multi-value image 5001 in the page memory 34. While various methods are used for the processing method of the rasterization, any rasterization method may be used for the configuration of the present invention and will not be described here.

Subsequently, in Step S403, the RIP 111 performs pseudo-halftone image processing for the 8 bit multi-value image 5001 in FIG. 5 by using the dither (1) 5002, and obtains a first binary image (1) 5004 having a density characteristic of gamma 1.0. The binary image (1) 5004 is temporarily stored in the RAM 102.

Further, in Step S404, the RIP 111 performs the pseudo-halftone processing for the 8 bit multi-value image 5001 by using the dither (2) 5003, and obtains a second binary image (2) 5005 having a density characteristic of gamma 1.1. The binary image (2) 5005 is also stored temporarily in the RAM 102.

In Step S405, the RIP 111 calculates a difference in each pixel between the binary image (2) 5005 and the binary image (1) 5004, and obtains a binary difference image 5006. The binary difference image 5006 is also stored temporarily in the RAM 102.

Here, the dither (1) 5002 and the dither (2) 5003 only have gamma characteristics different from each other and have the same so-called dither patterns, and thereby the generated binary images have the same dot growth patterns. Therefore, in the binary difference image 5006, only the pixels remain which are coming from the density difference caused by the difference in the gamma characteristics. Accordingly, as will be described below, a pseudo-halftone image (binary image (2) 5005) other than the first pseudo-halftone image can be generated from the binary difference image 5006 and the first pseudo-halftone image (binary image (1) 5004).

Figure 8:
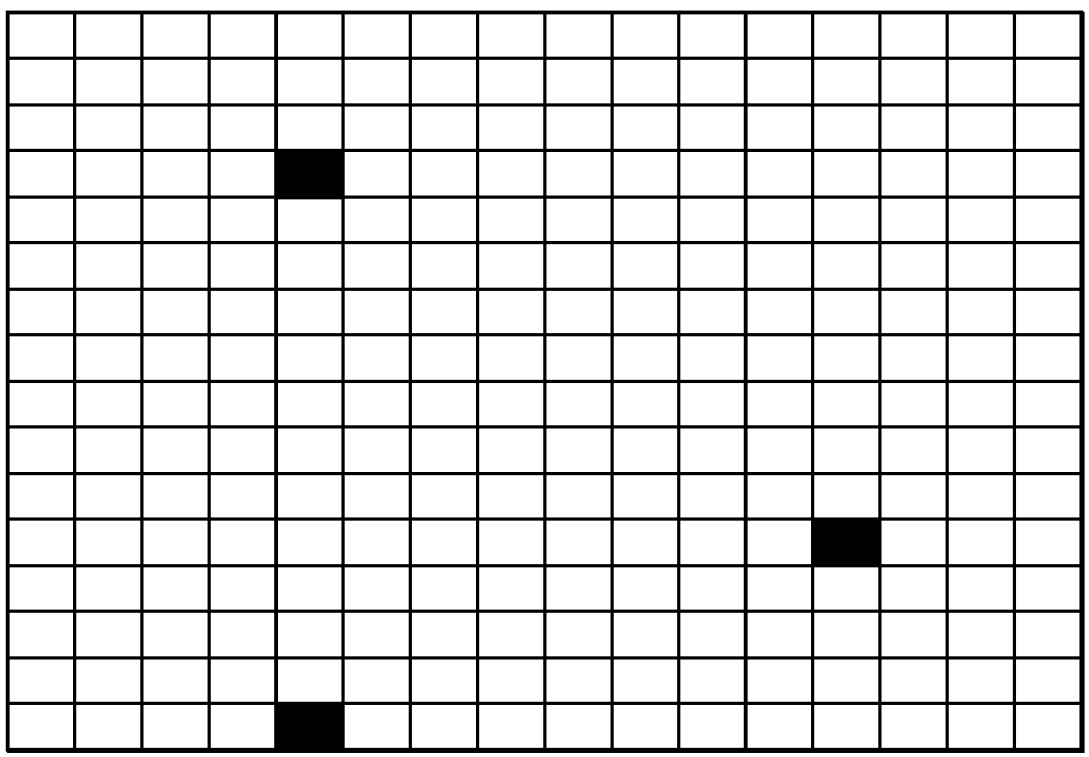
FIG. 8 is a diagram showing an example of a binary difference image in an embodiment of the present invention.

The gamma density conversion characteristic of the present embodiment does not change the minimum density value and the maximum density value in the 8 bit multi-value image between the density values before and after the density conversion. Therefore, the minimum density value pixels and the maximum density value pixels have the same values, between the binary image (1) and the binary image (2). Accordingly, the pixels of the minimum density value and the maximum density value in the 8 bit multi-value image are not recorded in the binary difference image 5006. Further, for the drawing object having a single density value of a medium density in the 8 bit multi-value image, only the number of dots corresponding to the density difference is recorded. For example, when the pseudo-halftone processing is performed on a rectangle which has 16×16 pixels and a density value of 10 in the 8 bit multi-value image and the dither (1) 5002 is used, the number of pixels which get to have a pixel value of one in the rectangle with 16×16 pixels is ten as shown in FIG. 7A. On the other hand, when the dither (2) 5003 is used, the number of pixels which get to have a pixel value of one is seven as shown in FIG. 7B. Accordingly, the number of pixels which remain as the binary difference image is only three as shown in FIG. 8. In this manner, in the binary difference image 5006, the number of pixels which get to have a pixel value of one is reduced considerably compared to the binary image (1) 5004 or the binary image (2) 5005. That is, the compressed data size of the binary difference image 5006 is considerably small compared to the data size of the binary image (1) 5004 or the binary image (2) 5005.

In Step S406, the RIP 111 performs JBIG compression for the binary image (1) 5004 and stores the compressed image in the document management section 36. In Step S407, the RIP 111 performs JBIG compression for the binary difference image 5006 and stores the compressed image in the document management section 36. Further, in Step S408, the RIP 111 associates the compressed binary image (1) 5004 and the compressed binary difference image 5006 with each other in a predetermined format within the document management section 36. That is, the first binary image and the binary difference image between the first and second binary images are stored in association with each other.

Figure 9:
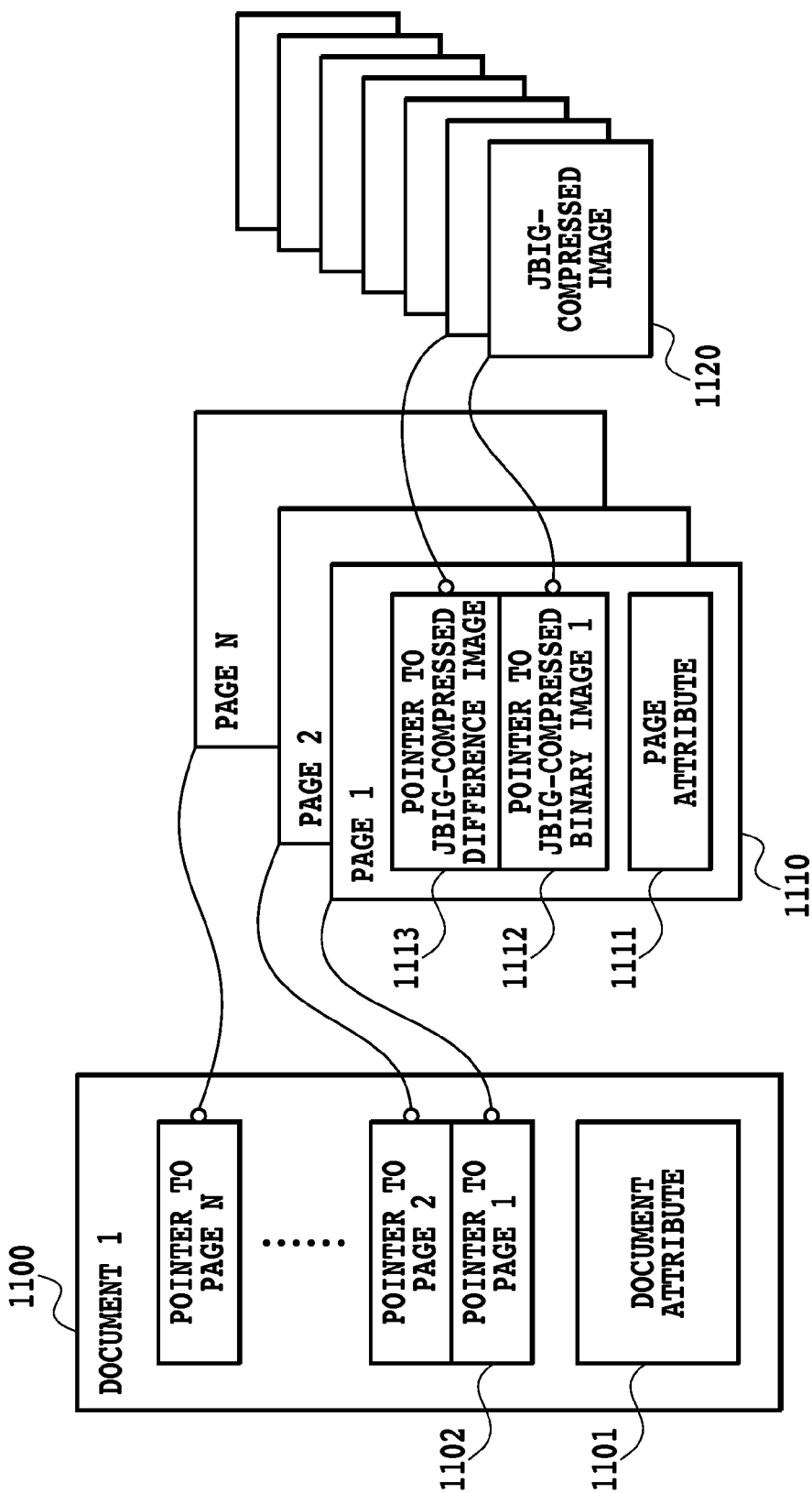
FIG. 9 is a diagram showing an example of a document management structure in an embodiment of the present invention.

FIG. 9 shows an example of a document management structure which is stored in the document management section 36.

A document management structure 1100 retains a document attribute 1101 and a pointer 1102 to at least one page management structure 1110, therein. The document attribute 1101 retains information necessary for the printing of a document which is composed of plural pages; for example, information such as whether to carry out sorting or not, whether to carry out staple or not, or whether to carry out printing of plural copies. The page management structure 1110 retains a page attribute 1111, a pointer 1112 to the binary image (1) subjected to the JBIG compression, and a pointer 1113 to the binary difference image subjected to the JBIG compression, therein. The page attribute 1111 retains information necessary for printing of some page in the document; for example, information such as a paper size, both side or one side, and a setting value regarding the image processing. A leading address of the binary image (1) 5004 which has been compressed in Step S408 is stored in the pointer 1112 and a leading address of the binary difference image 5006 which has been compressed is stored in the pointer 1113, and thereby the association of both images is carried out.

A combination example of the threshold value arrangement and the transfer speed of the printer engine 300 in the present embodiment will be described below. In the case of a high transfer speed in the printer engine 300, the dither (1) 5002 having a threshold value of gamma 1.0 which does not need the density characteristic correction is applied, and the first binary image (1) 5004 is generated. In the case of a low transfer speed, the dither (2) 5003 having a threshold value of gamma 1.1 for the density characteristic correction is applied and the second binary image (2) 5005 is generated. That is, in this example, the density characteristic of the binary image (pseudo-halftone image) is determined according to the transfer speed of the printer engine 300. Note that this combination information of the threshold value arrangement (i.e. gamma value) and the transfer speed is stored preliminarily in the storage unit such as the HDD 104.

Figure 10:
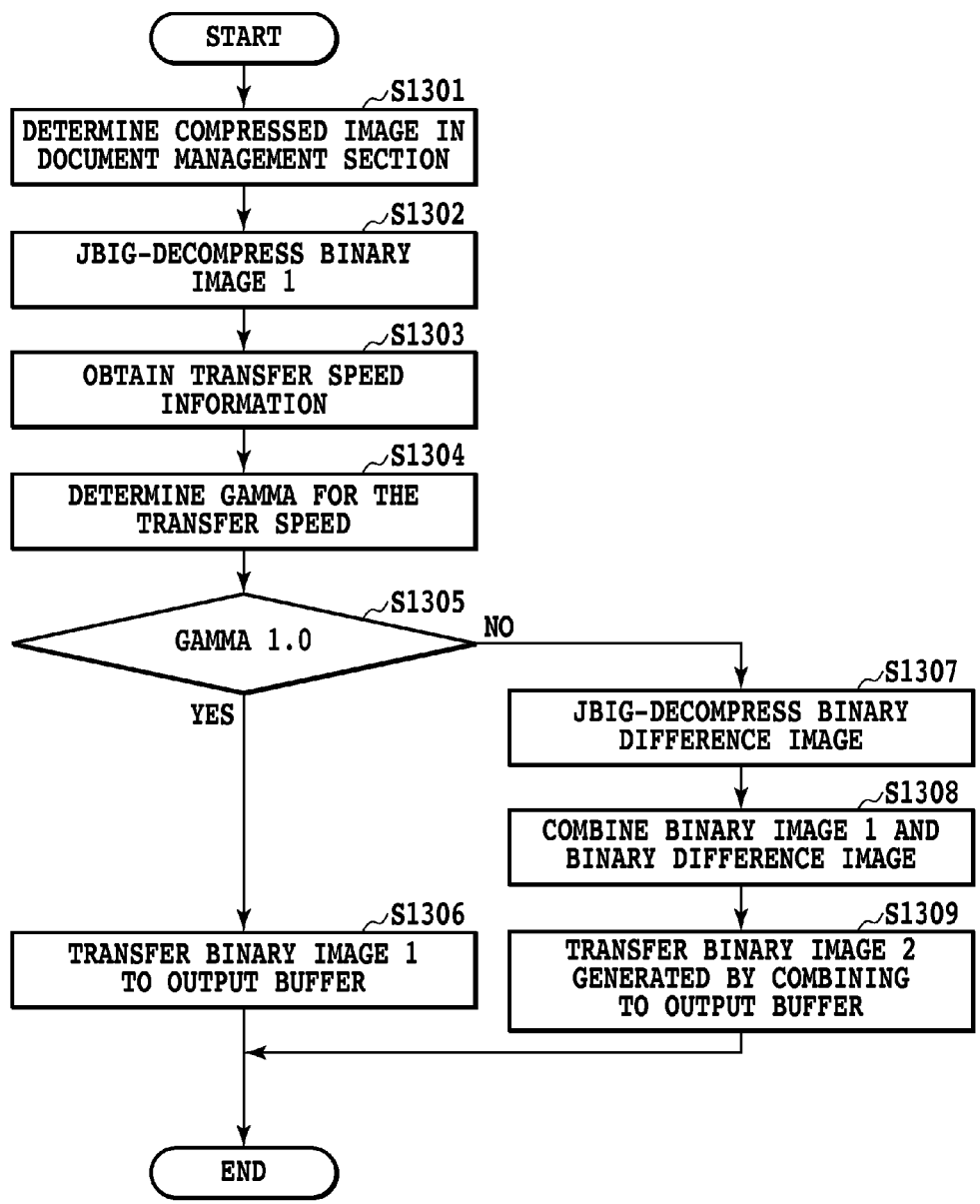
FIG. 10 is a flowchart showing a processing example of a digital multi-functional machine in an embodiment of the present invention.

FIG. 10 is a flowchart showing a processing flow example of the image decompression section 40 in the image data processing operated in the raster image processor (RIP) 111 of the present embodiment.

Figure 11:
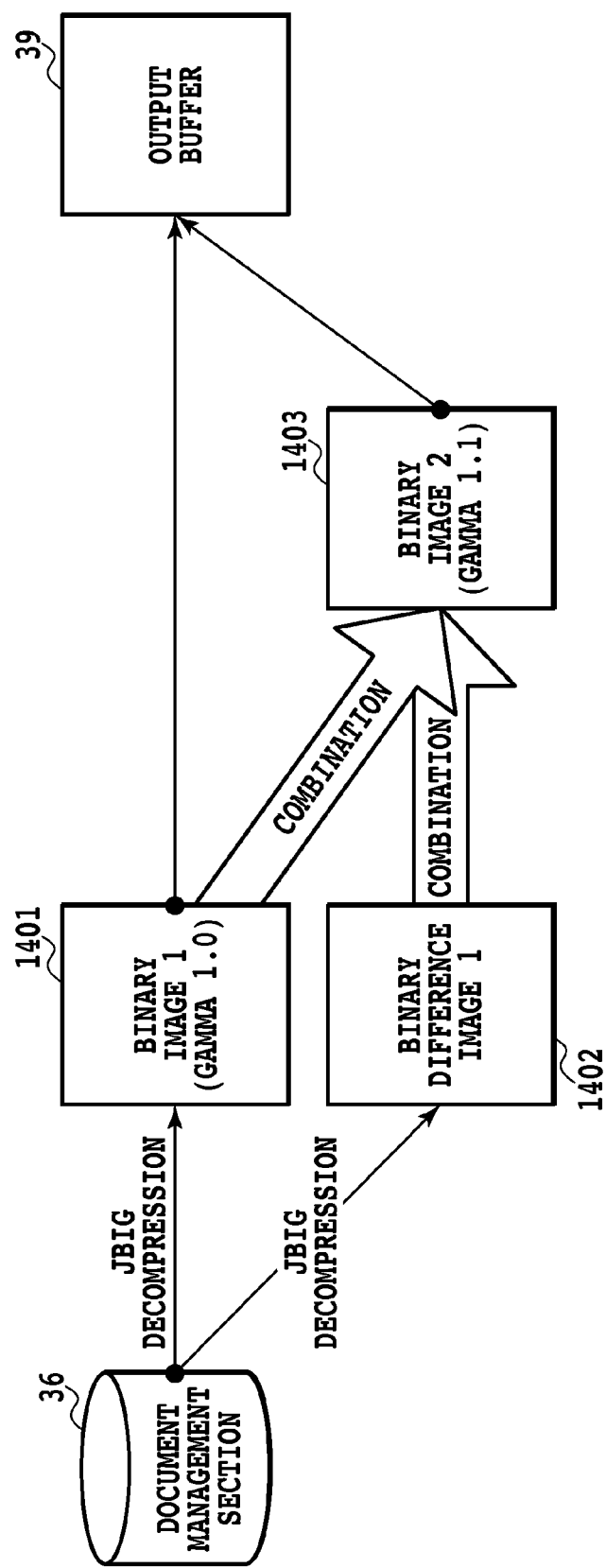
FIG. 11 is a conceptual diagram showing a processing example of a digital multi-functional machine in an embodiment of the present invention.

FIG. 11 is a diagram schematically showing the processing of FIG. 10.

The processing carried by the image decompression section 40 will be described below. The processing is controlled by the operation that the CPU 101 reads the program stored in the storage section such as the HDD 104 for carrying out the processing shown in FIG. 10, and executes the program.

Note that the predetermined recording paper transfer speed is assumed here to be the "high" transfer speed, to which the dither (1) 5002 having a threshold value of gamma 1.0 is applied.

First, in Step S1301, in response to the command received from the CPU 101, the RIP 111 obtains the document management structure 1100 including the compressed image to be printed, which is stored in the document management section 36. From this, the Rip 111 takes out the pointer 1112 to the binary image (1) which has been subjected to the JBIG compression and the pointer 1113 to the binary difference image which has been subjected to the JBIG compression in the page management structure 1110 of the page to be printed.

In Step S1302, the RIP 111 generates a binary image (1) 1401 by JBIG-decompressing the binary image (1) which has been subjected to the JBIG compression, and stores the binary image (1) 1401 temporarily in the RAM 102. The binary image (1) 1401 becomes the same as 5004 in FIG. 5.

In Step S1303, the RIP 111 obtains the paper size information in the page attribute 1111, transfers the paper size information to the print control section 38, and obtains information of the recording paper cassette to be used for the printing and information about the recording paper transfer speed. When the user does not instruct a change of the transfer speed via the operation section 150 or the like, the predetermined recording paper transfer speed is set to be "high speed", and thereby the information about the recording paper transfer speed becomes information indicating that the transfer speed is high. On the other hand, in the case that the setting of the transfer speed is changed by an instruction such as one which the user provides for indicating the change of the transfer speed via the operation section 150 or the like, the information about the transfer speed becomes information indicating the changed speed of "low speed" or the like, for example.

In Step S1304, the RIP 111 determines whether the gamma correction is necessary or not, from the above combination of the transfer speed and the gamma threshold value according to the information about the recording paper transfer speed obtained in Step S1303. Then, the RIP 111 determines the gamma value if the gamma correction is necessary for the change of the density characteristic. For example, in the case of "low speed" set for the recording paper transfer speed, the gamma value is determined to be "1.1". That is, by the determination of the gamma value, the density characteristic is determined for the printing of the pseudo-halftone image.

In Step S1305, if the gamma correction is not necessary for the change of the density characteristic, that is, the binary image (first pseudo-halftone image) is to be output in a gamma value of 1.0, the process goes to Step S1306. In Step S1306, the RIP 111 transfers the binary image (1) 1401 to the output buffer 39.

In Step S1305, if the gamma correction is determined to be necessary, that is, the binary image (first pseudo-halftone image) is determined to be output with a gamma value of 1.1, the process goes to Step S1307.

In Step S1307, the RIP 111 generates a binary difference image 1402 by performing JBIG decompression on the binary difference image which has been subjected to the JBIG compression, and stores the generated binary difference image 1402 temporarily in the RAM 102. The binary difference image 1402 becomes the same as 5006 in FIG. 5.

Further in Step S1308, the RIP 111 generates a binary image (2) 1403 by combining the binary image (1) 1401 and the binary difference image 1402 in the RAM 102. The binary image (2) 1403 becomes the same as 5005 in FIG. 5. That is, this processing generates the second binary image, which is a pseudo-halftone image, from the above first binary image and the binary difference image between the first and second binary images.

As described above, the processing from Step S1305 to Step S1308 generates the second pseudo-halftone image (binary image), if the print output is determined to be carried out in the density characteristic different from that of the first pseudo-halftone image (binary image). The second pseudo-halftone image is generated by the combination of the binary difference image (difference image) according to the determined density characteristic and the first pseudo-halftone image.

Subsequently in Step S1309, the binary image (2) 1403 is transferred to the output buffer 39.

Note that, for the above combination of the transfer speed and the gamma threshold value, when the transfer speed in the print engine is high, that is, the image decompression processing needs to be carried out in a high speed, the combination corresponds to the case that the gamma correction is not necessary and the processing load and processing time of the image decompression section 40 is small. On the other hand, when the transfer speed of the print engine is low, that is, the image decompression is allowed to be carried out using a relatively long time, the combination corresponds to the case that the gamma correction is necessary and the processing load and processing time of the image decompression section 40 is large.

As described above, the present embodiment generates the two binary images which have different gamma density characteristics for the print engine in which the output density characteristic is changed by the engine transfer speed, and enables the two images selectively to be used depending on the transfer speed in the engine output. That is, According to the present embodiment, it is possible to print and output the image data subjected to the pseudo-halftone processing in an appropriate density characteristic. Further, the controller section 100 stores the first binary image and the binary difference image between the first and second binary images and generates the second binary image from these images. Accordingly, it is possible to reduce the storage capacity compared to the case of storing the first binary image and the second binary image.

Note that, while the two kinds of binary images, which have different density characteristics from each other, can be generated from one multi-value image using the two kinds of dither threshold value arrangements in the present embodiment, the present invention is not limited to this method. Three or more kinds of binary images may be generated using three or more kinds of dither threshold value arrangements having different gamma values from one another.

Embodiment 2

In Embodiment 1, the data drawing section 33 generates the difference image 5006 after having generated the first binary image (1) 5004 and the second binary image (2) 5005 in the RAM 102 according to the processing shown in FIG. 4. The second binary image (2) 5005 is not stored finally in the document management section 36.

In the present embodiment, a processing method will be described for generating the first binary image (1) and the difference image at the same time while suppressing the RAM consumption by omitting the generation of the second binary image (2).

Figure 12A:
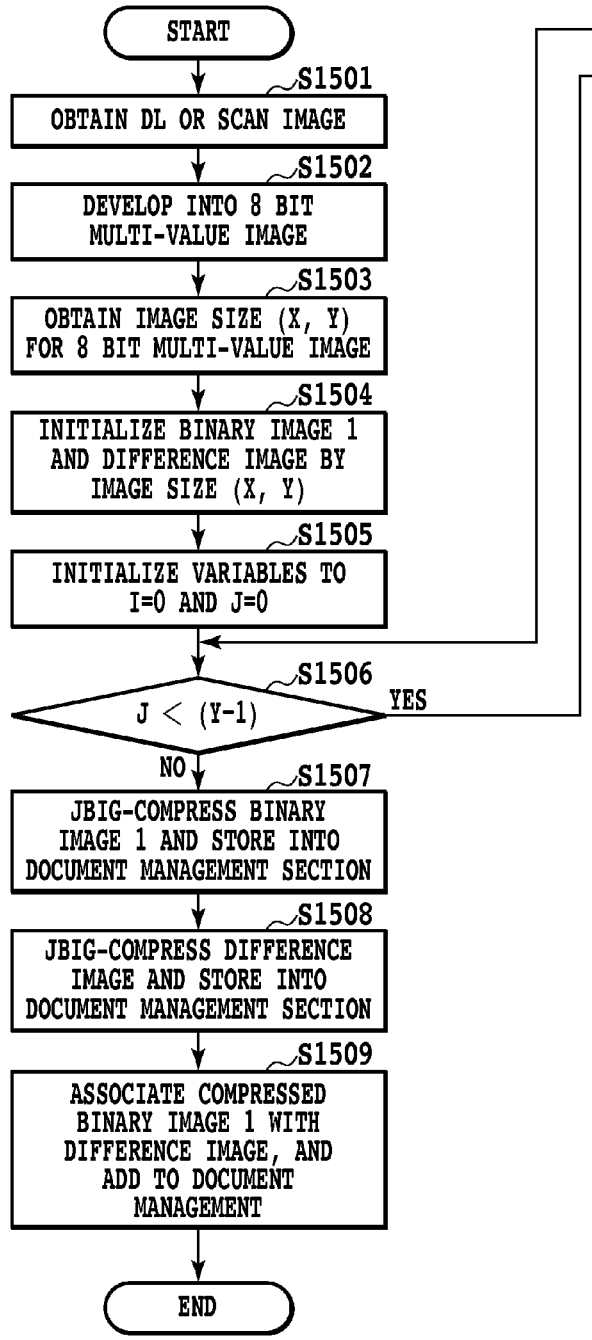
FIG. 12A is a flowchart showing a processing example of a digital multi-functional machine in an embodiment of the present invention.
Figure 12B:
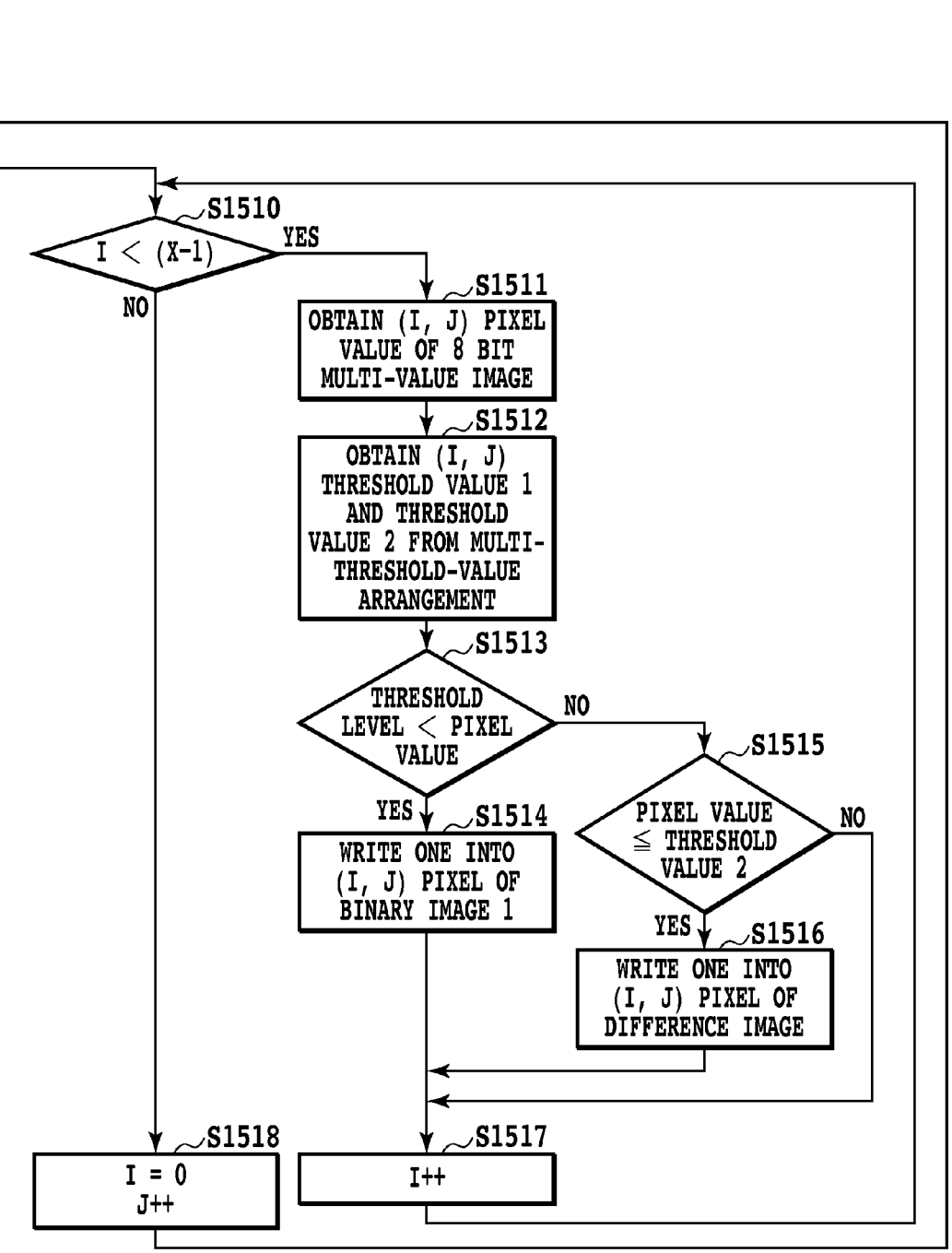
FIG. 12B is a flowchart showing a processing example of a digital multi-functional machine in an embodiment of the present invention.

FIG. 12A and FIG. 12B are a flowchart showing a processing flow example of the data drawing section 33 in the present embodiment.

Figure 13:
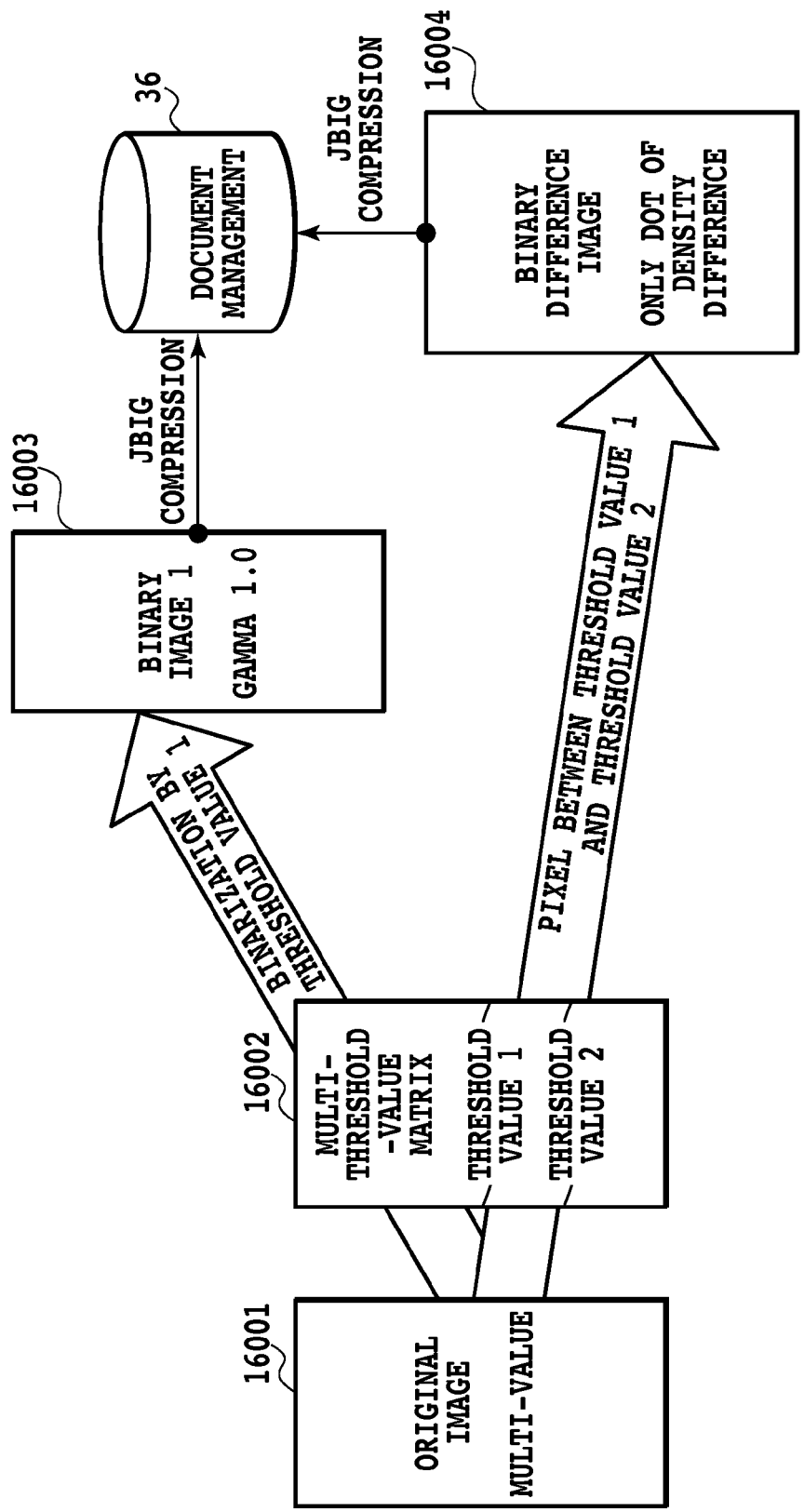
FIG. 13 is a conceptual diagram showing a processing example of a digital multi-functional machine in an embodiment of the present invention.

FIG. 13 is a diagram schematically showing a part of the processing of FIG. 12A and FIG. 12B.

FIG. 14 shows an example of a 16×16 dither multi-threshold-value arrangement, which corresponds to the multi-threshold-value matrix 16002 in FIG. 13. This threshold value arrangement is used for the pseudo-halftone processing of the 8 bit multi-value image. One element of the arrangement is an arrangement further including two threshold values as elements. A first threshold value element is a threshold value (1) corresponding to the linear density characteristic of gamma 1.0, and a second threshold value element is a density correction threshold value (2) of gamma 1.1.

The processing performed by the data drawing section 33 will be described below with reference to FIG. 12A and FIG. 12B. The control of the processing is carried out by the operation that the CPU 101 reads the program stored in the storage section such as the HDD 104 for carrying out the processing shown in FIG. 12A and FIG. 12B, and executes the program.

First, in Step S1501, in response to the command received from the CPU 101, the RIP 111 obtains the display list generated by the analysis and conversion in the PDL analysis section 32. This display list includes a character to be drawn, vector graphics, and drawing object information of a raster image.

Next, in Step S1502, the RIP 111 generates 8 bit multi-value image 16001 by rasterizing a drawing object in the obtained display list, and stores the 8 bit multi-value image 16001 in the page memory 34. While various methods are used for the processing method of the rasterization, any rasterization method may be used and will not be described here.

Subsequently, in Step S1503, the RIP 111 obtains the image size of the 8 bit multi-value image 16001 as (vertical size: X, horizontal size: Y) Further, in Step S1504, the RIP 111 secures memory areas in the RAM 102 for generating two screens of the binary image with (vertical size: X, horizontal size: Y) One of the areas is the area used for a binary image (1) 16003 and the other area is the area used for a binary difference image 16004. These two binary image areas are initialized to zero states.

In the following, a process loop will be described for generating the binary image (1) 16003 and the binary difference image 16004 while scanning the 8 bit multi-value image 16001 in the horizontal and vertical directions.

First, in Step S1505, the RIP 111 initializes a counter variable I indicating a horizontal coordinate and a counter variable J indicating a vertical coordinate by setting each variable to zero.

Next, in Step S1506, the RIP 111 compares the current vertical coordinate J with the vertical maximum value (Y−1) of the 8 bit multi-value image 16001. If J<(Y−1), the process goes to Step S1510, where the pixel is then scanned in the horizontal direction.

In Step S1510, the RIP 111 compares the current horizontal coordinate I with the horizontal maximum value (X−1) of the 8 bit multi-value image 16001. If I<(X−1), the RIP 111 obtains the 8 bit pixel value at the coordinates (I, J) of the 8 bit multi-value image 16001 in Step S1511. In Step S1512, the RIP 111 obtains the threshold values at a position corresponding to the above coordinates (I, J) from the multi-threshold-value matrix 16002. The obtained threshold values are the threshold value (1) corresponding to gamma 1.0 and the threshold value (2) corresponding to gamma 1.1.

In Step S1513, the RIP 111 compares the threshold value (1) and the 8 bit pixel value with each other. If the 8 bit pixel value is larger than the threshold value (1), the process goes to Step S1514, and if not so, the process goes to Step S1515. In Step S1514, the RIP 111 writes "1" in the pixel (I, J) of the first binary image (1) 16003, and goes to Step S1517.

In Step S1515, the RIP 111 compares the 8 bit pixel value and the threshold value (2) with each other. If the threshold value (2) is larger than or equal to the 8 bit pixel value, the process goes to Step S1516, and if not so, the process goes to Step S1517. In Step S1516, the RIP 111 writes "1" in the pixel (I, J) of the binary difference image 16004. That is, the processing in Steps S1514 and S1516 generates the binary difference image without generating the second binary image.

In Step S1517, the RIP 111 increments the counter variable I indicating the horizontal coordinate, and returns to Step S1510. If not I<(X−1) in Step S1510, the horizontal scan is completed. In Step S1515, the RIP 111 sets I=0 and increments the counter variable J indicating the vertical coordinate, and then returns to Step S1506.

If not J<(Y−1) in Step S1506, the processing of all the pixels within the 8 bit multi-value image 16001 is completed. In Step S1507, the RIP 111 performs the JBIG compression on the binary image (1) 16003 and stores the compressed binary image in the document management section 36. In Step S1508, the RIP 111 performs the JBIG compression on the binary difference image 16004 and stores the compressed binary difference image in the document management section 36. Further in Step S1509, the RIP 111 associates the compressed binary image (1) and the compressed binary difference image with each other in a predetermined format within the document management section 36. That is, the first binary image and the binary difference image are associated with each other and stored.

As described above, the present embodiment, while carrying out the same level processing as Embodiment 1 regarding the data drawing section 33 in Embodiment 1, can reduce the storage capacity necessary for the processing in the RAM 102, because one of the binary images generated within the RAM 102 is omitted. Further, since the processing in the present embodiment generates the binary difference image, it is not necessary to carry out the differential computation between the two kinds of binary images.

Embodiment 3

The image data treated by the digital multi-functional machine includes a scan image optically read by the scanner mounted on the digital multi-functional machine itself, in addition to the image data generated from the print data such as the PDL. These types of image data can be stored in the secondary storage unit which is the document management section and also can be reused. This function is called "document box". The image stored in the document box can be transmitted to another digital multi-functional machine connected through the network. The present embodiment describes a method of carrying out the density gamma correction for the image transmitted or received between the digital multi-functional machines connected with each other via the network.

Figure 15:
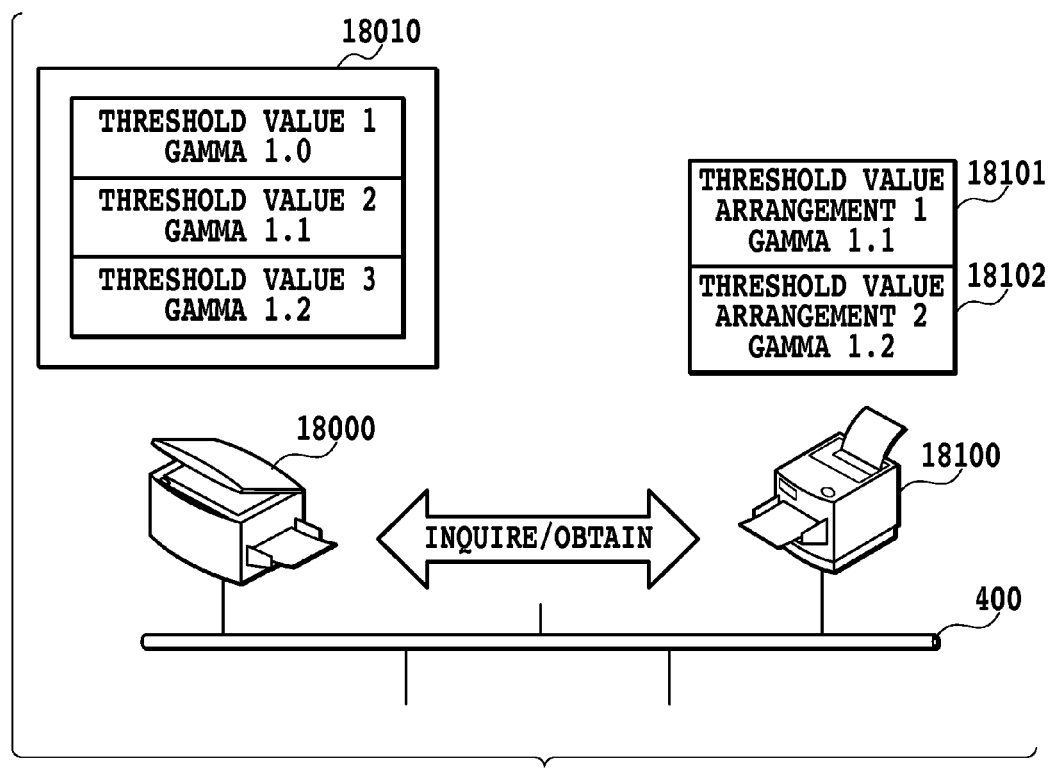
FIG. 15 is a conceptual diagram showing an example of a print processing system in another embodiment of the present invention.

FIG. 15 is a configuration diagram showing a concept of transmitting and receiving the gamma correction information between the two digital multi-functional machines connected with each other via the network.

A first digital multi-functional machine 18000 has an optical scanner.

A second digital multi-functional machine 18100 needs not have the optical scanner, and has a function of printing and outputting the pseudo-halftone image received via the LAN 400. Further, the digital multi-functional machine 18100 has a function of carrying out density calibration. The result of carrying out the density calibration is stored as a dither threshold value arrangement 18101 and a dither threshold value arrangement 18102 for the pseudo-halftone processing of the 8 bit multi-value image. The threshold value arrangement 18101 and the threshold value arrangement 18102 are the threshold value arrangements for correcting the image density characteristic such that the density characteristic matches that of the printer engine for printing. For example, the threshold value arrangement 18101 and the threshold value arrangement 18102 are the threshold value arrangement of FIG. 6 carrying out the density correction of gamma 1.1 and the dither threshold value arrangement of FIG. 16 carrying out the density correction of gamma 1.2, respectively. The second digital multi-functional machine 18100 carries out the density calibration periodically and stores a representative threshold value arrangement from the result. Note that the digital multi-functional machine 18100 may be a printing apparatus instead of the digital multi-functional machine.

The threshold value arrangement 18010 in the first digital multi-functional machine 18000 is the threshold value arrangement for performing the pseudo-halftone processing on the 8 bit multi-value image within the first digital multi-functional machine 18000. This threshold value arrangement has threshold values shown in FIG. 6 and the gamma characteristic thereof is 1.0. Further, the first digital multi-functional machine 18000 communicates with the second digital multi-functional machine 18100 via the LAN 400, and thereby can obtain the threshold value arrangement 18101 and the threshold value arrangement 18102. As a result, the first digital multi-functional machine 18000 can store three kinds of the threshold value arrangements. These three kinds of threshold value arrangements are stored in the first digital multi-functional machine 18000 as the dither multi-threshold-value arrangement shown in FIG. 17.

Subsequently, the processing carried out in the data drawing section 33 in the first digital multi-functional machine 18000 will be described with reference to FIG. 18A, FIG. 18B and FIG. 19. Compared with the processing of FIG. 12A, FIG. 12B and FIG. 13 for Embodiment 2, this processing is one which treats the scan image as the input image data and has an additional binary difference image 22005 generated by a threshold value 3. The control of this processing is carried out by the operation that the CPU 101 reads the program stored in the storage section such as the HDD 104 for carrying out the processing shown in FIG. 18A and FIG. 18B, and executes the program.

First, in Step S2101, in response to the command received from the CPU 101, the RIP 111 obtains the scan image from the scan control section 37 or the display list from the PDL analysis section 32. The scan image is the 8 bit multi-value image which the scan control section generates by the image processing of the bit map image optically scanned by the scanner unit 210. The display list includes a character to be drawn, vector graphics, and drawing object information of the raster image.

Next, in Step S2102, the RIP 111, in the case of obtaining the display list, generates an 8 bit multi-value image 22001 and stores the 8 bit multi-value image 22001 in the page memory 34 by rasterizing the drawing object within the display list. While various methods are used for the processing method of the rasterization, any rasterization method may be used and will not be described here. In the case of the scan image, the RIP 111 stores the scan image, which is the 8 bit multi-value image, in the page memory 34.

Subsequently, in Step S2103, the RIP 111 obtains the image size of the 8 bit multi-value image 22001 as (vertical size: X, horizontal size: Y). Further in Step S2104, the RIP 111 secures memory areas in the RAM 102 for generating three screens of the binary image with (vertical size: X, horizontal size: Y). One of the areas is the area used for a binary image (1) 22003 and the other two areas are the areas used for a first binary difference image (1) 22004 and a second binary difference image (2) 22005. These three binary image areas are initialized to zero states.

In the following, a process loop will be described for generating the binary image 22003, the first binary difference image (1) 22004, and the second binary difference image (2) 22005, while scanning the 8 bit multi-value image 22001 in the horizontal and vertical directions.

First, in Step S2105, the RIP 111 initializes a counter variable I indicating a horizontal coordinate and a counter variable J indicating a vertical coordinate by setting each to zero.

Next, in Step S2206, the RIP 111 compares the current vertical coordinate J with the vertical maximum value (Y−1) of the 8 bit multi-value image 22001. If J<(Y−1), the process goes to Step S2110, where the pixel is then scanned in the horizontal direction.

In Step S2111, the RIP 111 compares the current horizontal coordinate I with the horizontal maximum value (X−1) of the 8 bit multi-value image 22001. If I<(X−1), the RIP 111 obtains the 8 bit pixel value at the coordinates (I, J) of the 8 bit multi-value image 22001 in Step S2112.

In Step S2113, the RIP 111 obtains the threshold values at a position corresponding to the above coordinates (I, J) from the multi-threshold-value matrix 22002. The obtained threshold values are the threshold value (1) corresponding to gamma 1.0, the threshold value (2) corresponding to gamma 1.1, and the threshold value (3) corresponding to gamma 1.2.

In Step S2114, the RIP 111 compares the threshold value (1) and the 8 bit pixel value with each other. If the 8 bit pixel value is larger than the threshold value (1), the process goes to Step S2115, and if not so, the process goes to Step S2116. In Step S2115, the RIP 111 writes "1" in the pixel (I, J) of the binary image (1) 22003, and goes to Step S2120.

In Step S2116, the RIP 111 compares the 8 bit pixel value and the threshold value (2) with each other. If the threshold value (2) is larger than or equal to the 8 bit pixel value, the process goes to Step S2117, and if not so, the process goes to Step S2118. In Step S2117, the RIP 111 writes "1" in the pixel (I, J) of the binary difference image 22004.

In Step S2118, the RIP 111 compares the 8 bit pixel value and the threshold value (3) with each other. If the threshold value (3) is larger than or equal to the 8 bit pixel value, the process goes to Step S2119, and if not so, the process goes to Step S2120. In Step S2119, the RIP 111 writes "1" in the pixel (I, J) of the binary difference image 22004.

In Step S2120, the RIP 111 increments the counter variable I indicating the horizontal coordinate, and returns to Step S2111. If not I<(X−1) in Step S2111, the horizontal scan is completed. In Step S2121, the RIP 111 sets I=0 and increments the counter variable J indicating the vertical coordinate, and then returns to Step S2106.

If not J<(Y−1) in Step S2106, the processing of all the pixels within the 8 bit multi-value image 22001 is completed. In Step S2107, the RIP 111 performs the JBIG compression on the binary image 22003 and stores the compressed binary image in the document management section 36. In Step S2108, the RIP 111 performs the JBIG compression on the binary difference image 22004 and stores the compressed binary difference image in the document management section 36. In Step S2109, the RIP 111 performs the JBIG compression on the binary difference image 22005 and stores the compressed binary difference image in the document management section 36. Further in Step S2110, the RIP 111 associates the compressed binary image with the compressed binary difference image (1) and the compressed binary difference image (2) in a predetermined format within the document management section 36. That is, the binary image, the first binary difference image, and the second binary difference image are associated with one another and stored.

Figure 20:
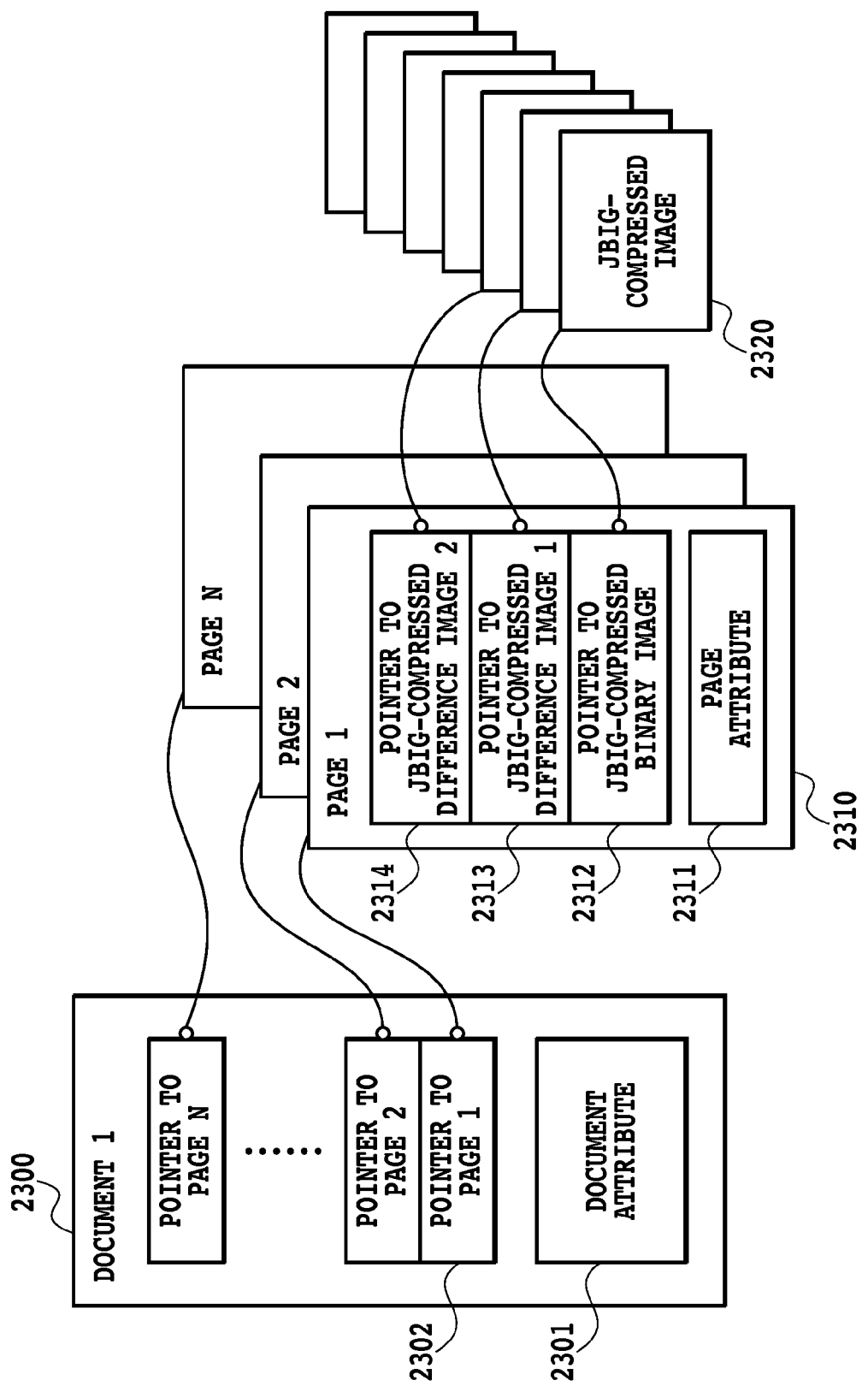
FIG. 20 is a diagram showing an example of a document management structure in another embodiment of the present invention.

FIG. 20 shows an example of the document management structure which is stored in the document management section 36. Embodiment 1 has one pointer 1113 to the difference image subjected to the JBIG compression as shown in FIG. 9. The present embodiment is different in that the present embodiment has pointers to the two difference images; a pointer 2313 to the difference image 1 which has been subjected to the JBIG compression and a pointer 2314 to the difference image 2 which has been subjected to the JBIG compression.

Subsequently, the processing carried out by the image decompression section 40 in the second digital multi-functional machine 18100 will be described with reference to FIG. 21 and FIG. 22. This processing is different from the processing described in FIG. 12A, FIG. 12B and FIG. 13 for Embodiment 2 in that a binary difference image (2) 2504 is used for generating a binary image (3) 2505 which corresponds to the density correction of gamma 1.2. The control of this processing is carried out by the operation that the CPU 101 reads the program stored in the storage section such as the HDD 104 for carrying out the processing shown in FIG. 21 and executes the program.

First, in Step S2401, in response to the command received from the CPU 101, the RIP 111 obtains the document management structure 2300 including the compressed image to be printed, which is stored in the document management section 36 of the first digital multi-functional machine 18000. From this, the Rip 111 takes out a pointer 2312 to the binary image (1) which has been subjected to the JBIG compression and a pointer 2313 to the binary difference image (1) which has been subjected to the JBIG compression in the page management structure 2310 of the page to be printed.

In Step S2402, the RIP 111 generates a binary image (1) 2501 by JBIG-decompressing the binary image (1) which has been subjected to the JBIG compression, and stores the binary image (1) 2501 temporarily in the RAM 102. The binary image (1) 2501 becomes the same as 22003 in FIG. 19.

In Step S2403, the RIP 111 obtains the current engine density information from the print control section 38 in the second digital multi-functional machine 18100. In Step S2404, the RIP 111 determines the gamma correction value corresponding to the current engine density information.

In Step S2405, if the gamma correction is determined not to be necessary for the density characteristic change, that is, if the binary image is determined to be output in gamma 1.0, the RIP 111 transfers the binary image (1) 2501 to the output buffer 39 in Step S2406.

In Step S2405, if the gamma correction is determined to be necessary for the density characteristic change, that is, if the binary image is determined to be output in gamma 1.1 or gamma 1.2, the process goes to Step S2407. In Step S2407, the RIP 111 generates a binary difference image 2502 by performing the JBIG decompression on the binary difference image (1) which has been subjected to the JBIG compression, and stores the binary difference image 2502 temporarily in the RAM 102. Further, in Step S2408, the RIP 111 generates a binary image (2) 2503 by combining the binary image (1) 2501 and the binary difference image 2502 in the RAM 102.

If the correction value is determined to be gamma 1.1 in Step S2409, the RIP 111 transfers the binary image (2) 2503 to the output buffer 39 in Step S2410. If the correction value is determined to be gamma 1.2, the process goes to Step S2411. In Step S2411, the RIP 111 generates a binary difference image 2504 by performing the JBIG decompression on the binary difference image (2), and stores the binary difference image 2504 temporarily in the RAM 102.

Further, in Step S2412, the RIP 111 generates the binary image (3) 2505 by combining the binary image (2) 2503 and the binary difference image 2504 in the RAM 102. Subsequently, the CPU 101 transfers the binary image (3) 2505 to the output buffer 39 in Step S2413.

As described above, the present embodiment enables the gamma correction to be carried out selectively in the receiving side digital multi-functional machine for the image transmitted or received between the digital multi-functional machines connected with each other via the network. For this purpose, the transmission side digital multi-functional machine includes a unit which obtains the information of the gamma density correction dither threshold value arrangement in the receiving side digital multi-functional machine. Further, the receiving side digital multi-functional machine includes a unit which carries out the gamma density correction using the received multi-gamma-value binary image and difference image.

Note that, while the present embodiment generates the plurality of threshold value arrangements using the result of the density calibration carried out in the second digital multi-functional machine 18100, a plurality of representative threshold value arrangements may be preset preliminarily when the digital multi-functional machine is shipped.

Further, while the present embodiment is assumed to be able to generate the three kinds of binary images which have the different density characteristics from one multi-value image using the multi-threshold-value arrangements having the three kinds of gamma values, the present invention is not limited to this method. Four or more kinds of binary images may be generated using four or more kinds of gamma values.

Embodiment 4

Embodiment 3 describes the case that one receiving side digital multi-functional machine exists and the output density characteristic thereof is changed by the calibration.

The present embodiment describes a method of carrying out the gamma density correction in the case that a plurality of receiving side digital multi-functional machines exists among the digital multi-functional machines connected with one another via the network.

Figure 23:
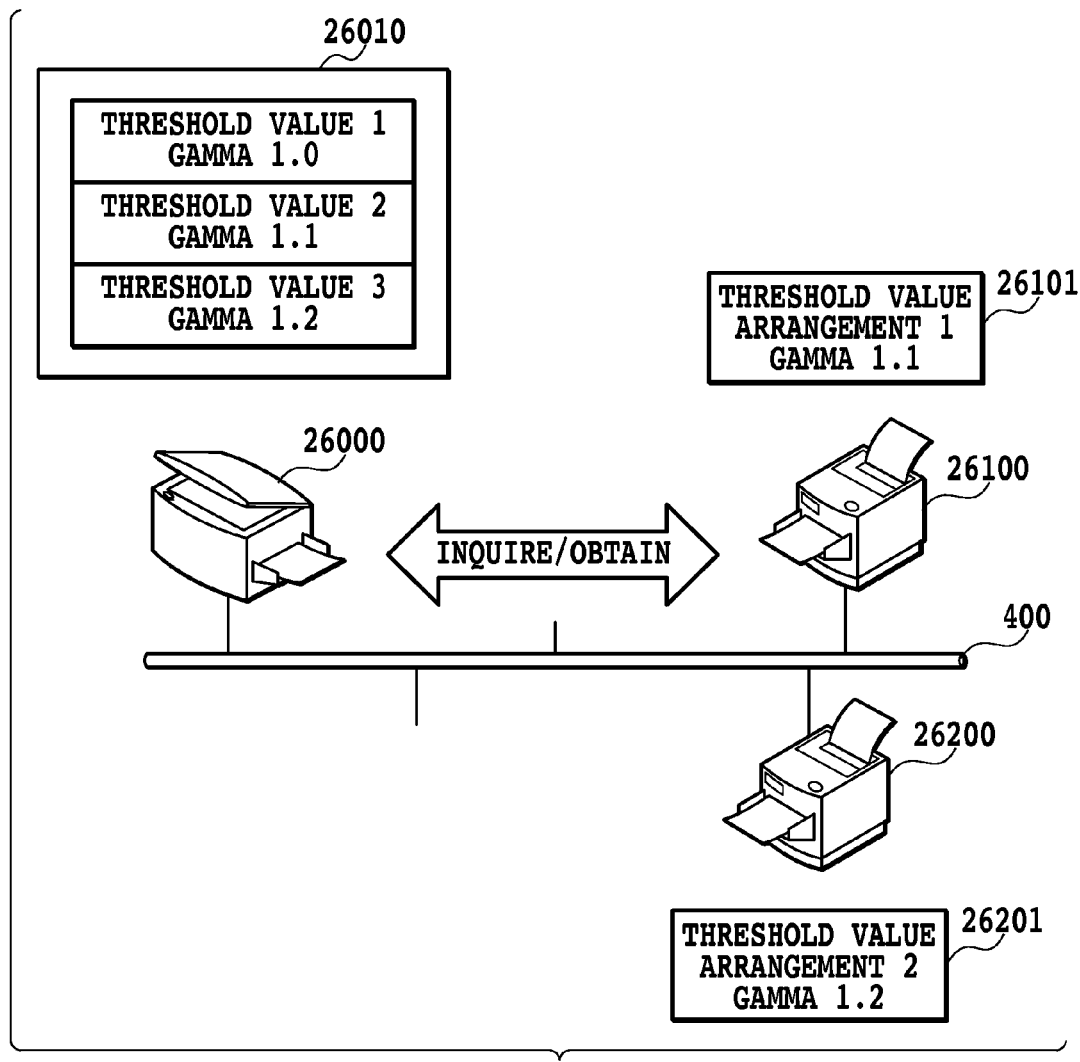
FIG. 23 is a conceptual diagram showing an example of a print processing system in another embodiment of the present invention.

FIG. 23 is a configuration diagram showing a concept of transmitting and receiving the gamma correction information among three digital multi-functional machines connected with one another other via the network.

A first digital multi-functional machine 26000 has an optical scanner.

A second digital multi-functional machine 26100 and a third digital multi-functional machine 26200 need not have the optical scanners, and have functions of printing and outputting a pseudo-halftone image received via the LAN 400. The second digital multi-functional machine 26100 and the third digital multi-functional machine 26200 have different output density characteristics from each other, and store a threshold value arrangement 26101 and a threshold value arrangement 26201 for the pseudo-halftone processing of the 8 bit multi-value image, respectively. The threshold value arrangement 26101 and the threshold value arrangement 26201 are the threshold value arrangements for correcting the engine density characteristics, and are the threshold value arrangement of FIG. 6B carrying out the gamma 1.1 density correction and the threshold value arrangement of FIG. 16 carrying out the gamma 1.2 density correction, respectively, for example.

A threshold value arrangement 26010 in the first digital multi-functional machine 26000 is the threshold value arrangement for performing the pseudo-halftone processing on the 8 bit multi-value image within the first digital multi-functional machine 26000. This threshold value arrangement has the threshold values shown in FIG. 6A which have the gamma characteristic of 1.0. Further, the first digital multi-functional machine 26000 communicates with the second digital multi-functional machine 26100 and the third digital multi-functional machine 26200 via the LAN 400 and can obtain the threshold value arrangement 26101 and the threshold value arrangement 26201. As a result, the first digital multi-functional machine 26000 can retain the three kinds of threshold value arrangements. The first digital multi-functional machine 26000 retains these three threshold value arrangements as the multi-threshold-value arrangement shown in FIG. 17.

Figure 18A:
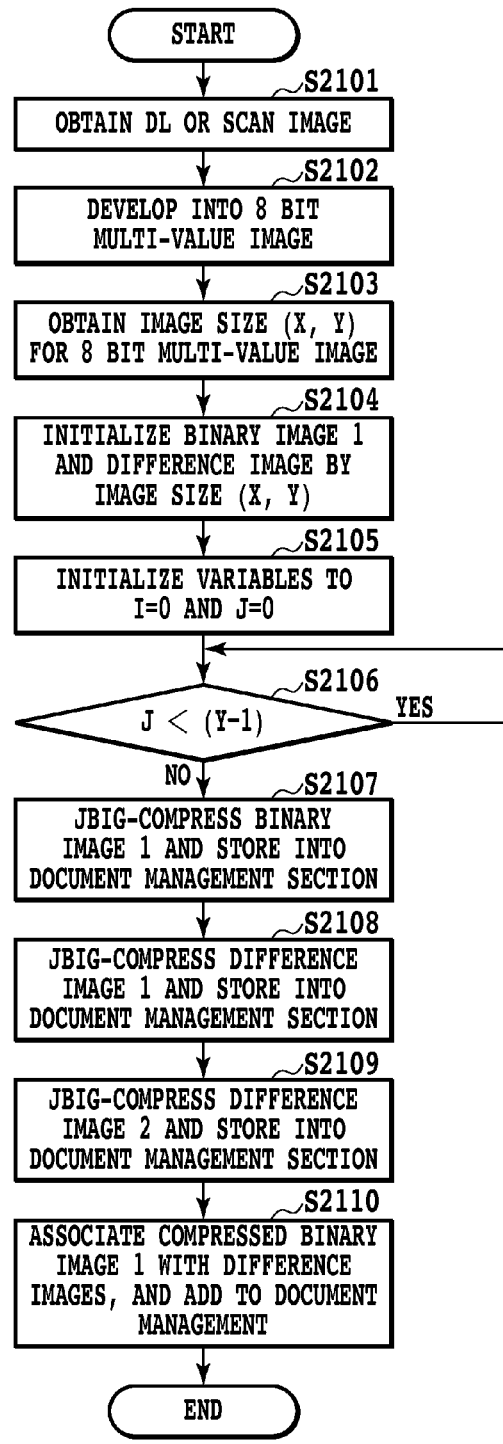
FIG. 18A is a flowchart showing a processing example of a digital multi-functional machine in another embodiment of the present invention.
Figure 18B:
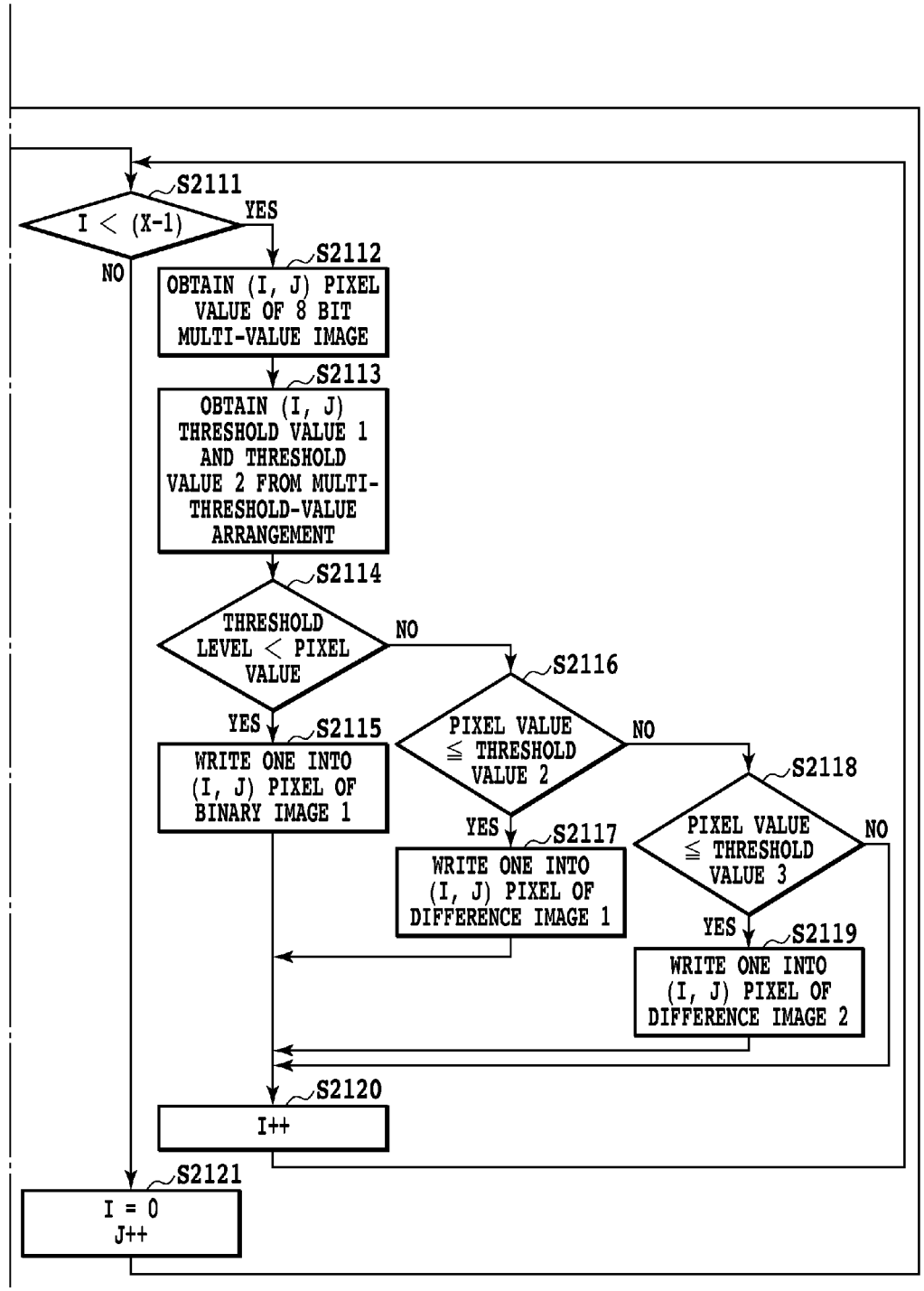
FIG. 18B is a flowchart showing a processing example of a digital multi-functional machine in another embodiment of the present invention.
Figure 19:
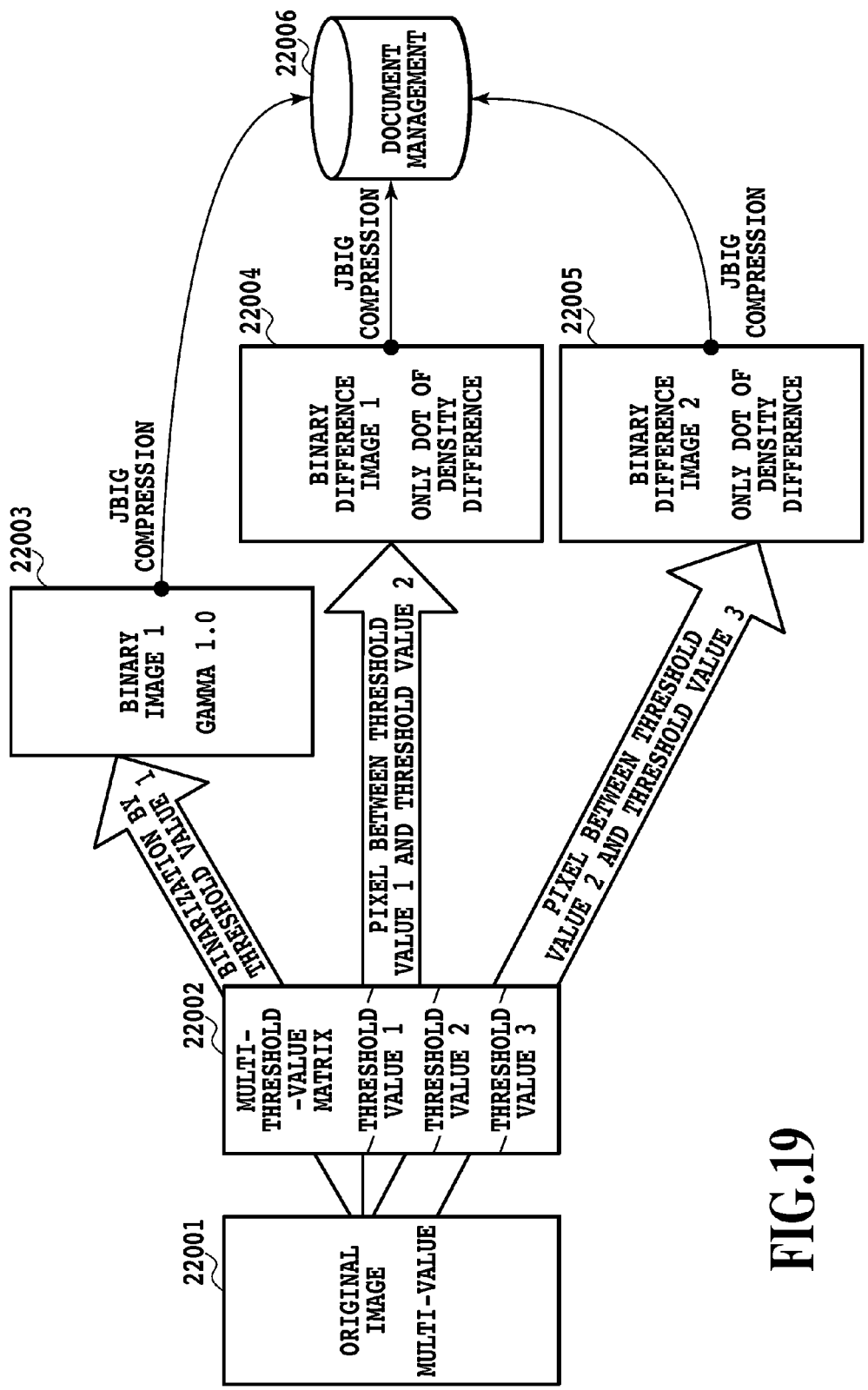
FIG. 19 is a conceptual diagram showing a processing example of a digital multi-functional machine in another embodiment of the present invention.

The processing carried out in the data drawing section 33 of the first digital multi-functional machine 26000 is the same as the processing described in Embodiment 3 using FIG. 18A, FIG. 18B and FIG. 19.

Figure 21:
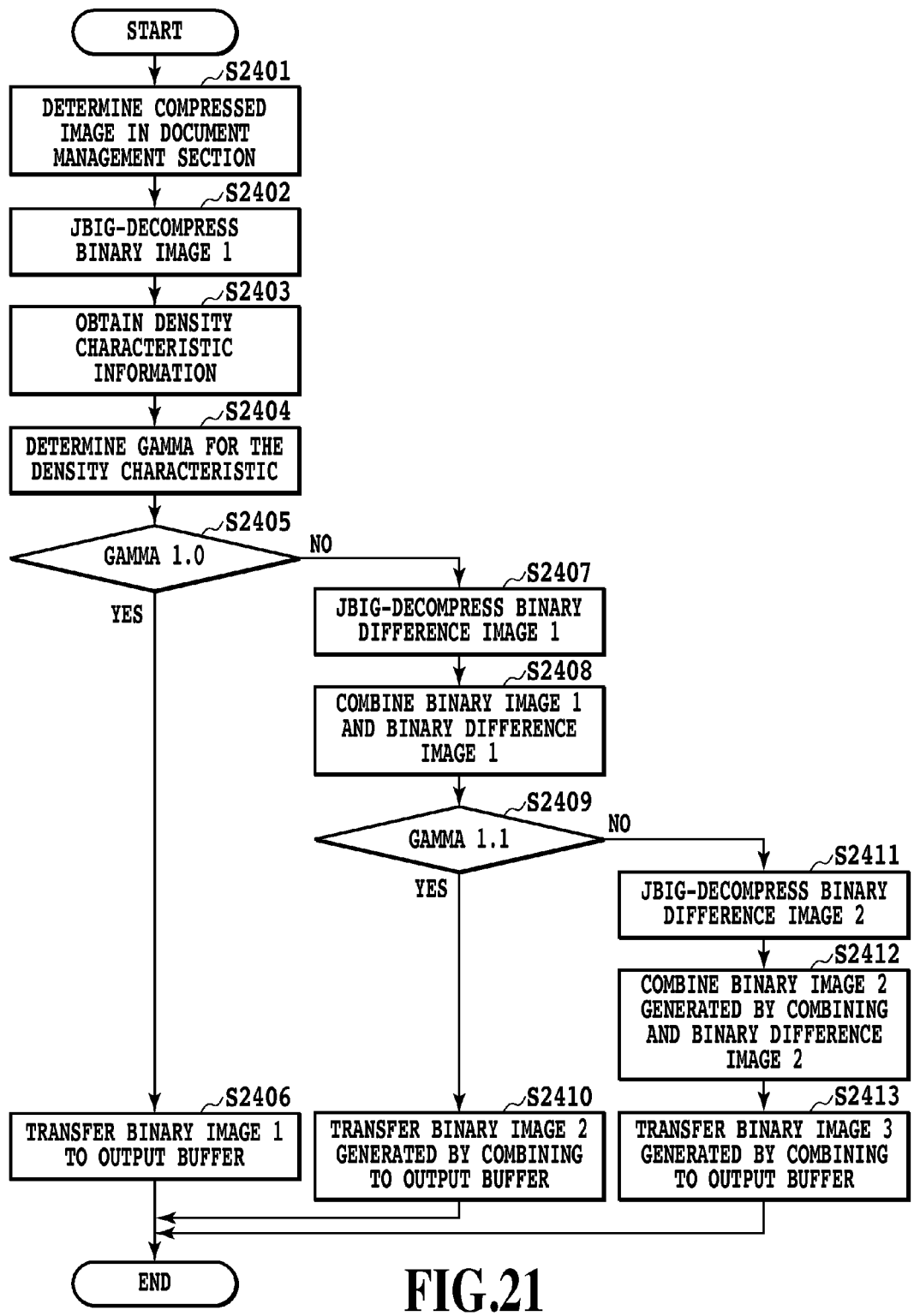
FIG. 21 is a flowchart showing a processing example of a digital multi-functional machine in another embodiment of the present invention.
Figure 22:
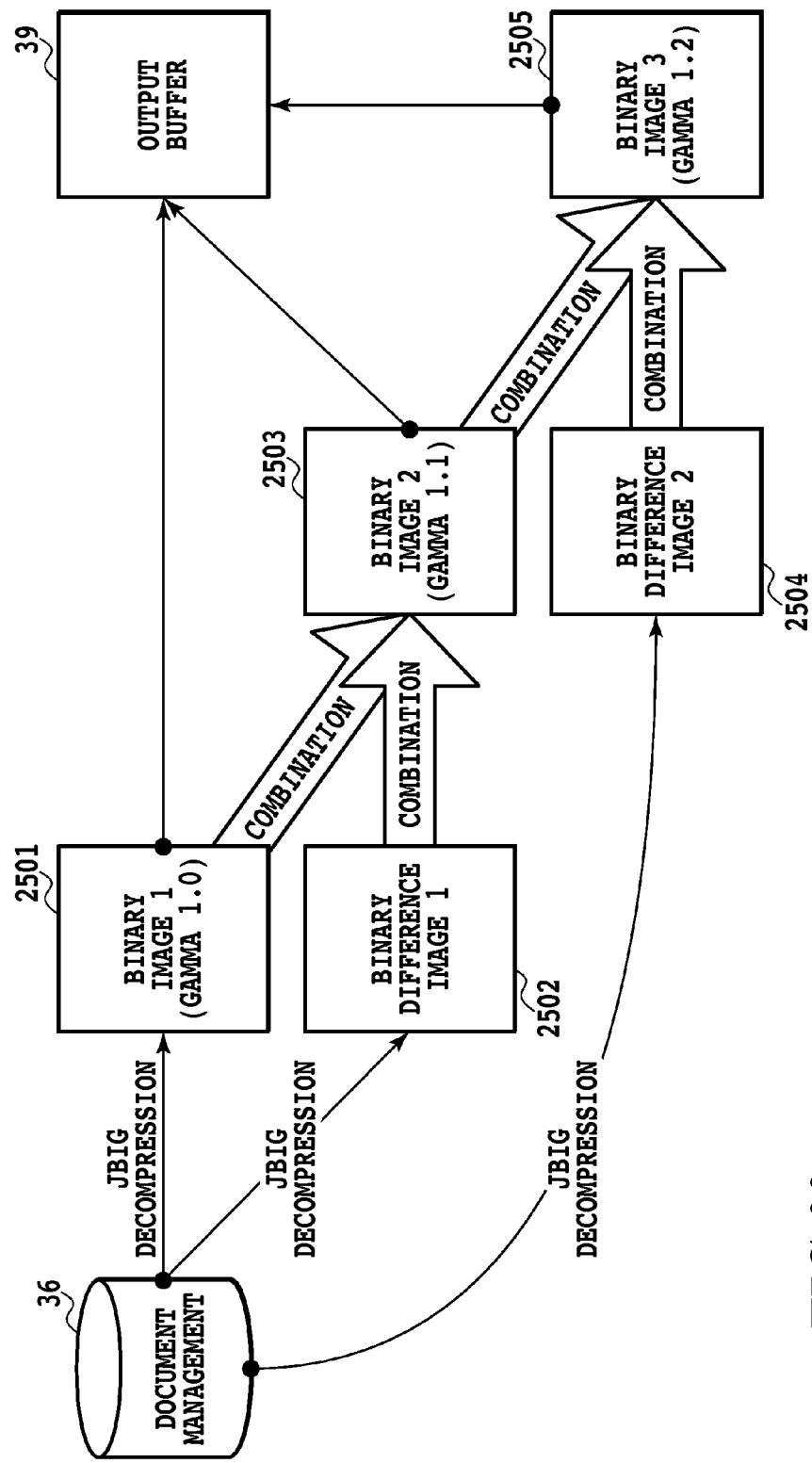
FIG. 22 is a conceptual diagram showing a processing example of a print processing system in another embodiment of the present invention.

The processing carried out in the image decompression section 40 of the second digital multi-functional machine 26100 or the third digital multi-functional machine 26200 is the same as the processing described in Embodiment 3 using FIG. 21 and FIG. 22.

As described above, the present embodiment enables the gamma density correction to be carried out selectively in the plurality of receiving side digital multi-functional machines for the image transmitted or received between the digital multi-functional machines connected with each other via the network. For this purpose, the transmission side digital multi-functional machine includes a unit which obtains the information about the gamma density correction dither threshold value arrangements in the plurality of receiving side digital multi-functional machines. Further, the receiving side digital multi-functional machine includes a unit which carries out the gamma density correction using the transmitted multi-gamma-value binary image and difference image.

Note that, while the present embodiment stores the threshold value arrangements in the second digital multi-functional machine 26100 and the third digital multi-functional machine 26200, respectively, a plurality of representative threshold value arrangements of the digital multi-functional machine may be preset preliminarily when the first digital multi-functional machine is shipped.

Embodiment 5

Embodiment 1 or Embodiment 2 stores the binary image subjected to the JBIG compression in the document management section 36, notwithstanding the capacities of the binary image (1) and the binary difference image after the compression. However, there is also a case in which the capacity of an image generated from the original 8 bit multi-value image subjected to the JBIG compression is smaller than the storage capacity of these two binary images subjected to the JBIG compression. The present embodiment is accommodated to such a case.

Figure 24B:
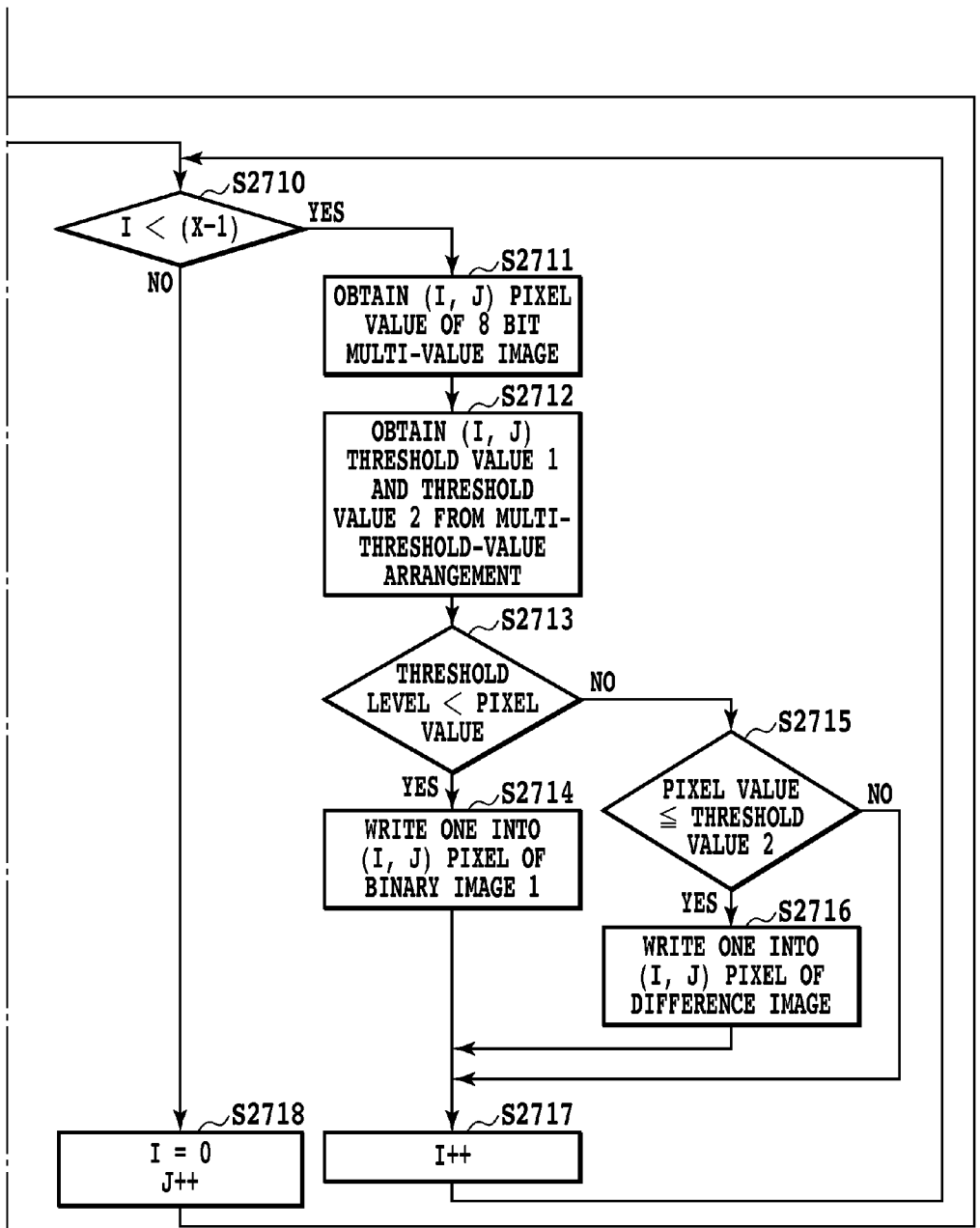
FIG. 24B is a flowchart showing a processing example of a digital multi-functional machine in another embodiment of the present invention.

FIG. 24A and FIG. 24B are a flowchart showing a processing flow example of the data drawing section 33 in the image data processing operated by the raster image processor (RIP) 111 in the present embodiment. The control of this processing is carried out by the operation that the CPU 101 reads the program stored in the storage section such as the HDD 104 for carrying out the processing shown in FIG. 24A and FIG. 24B, and executes the program.

The difference from FIG. 12A and FIG. 12B of Embodiment 2 is that a unit is provided for performing the JBIG compression on the 8 bit multi-value image in Step S2709 and for storing the compressed image temporarily in the RAM 102, and that the processing of Step S2719 and the succeeding step is provided.

In Step S2709, in response to the command from the CPU 101, the RIP 111 obtains a sum of the capacities of the binary image (1) having been subjected to the JBIG compression and the difference image having been subjected to the JBIG compression, which are stored in the document management section 36 (capacity of first compressed data). Then, the RIP 111 compares the capacity of the first compressed data and the capacity of the 8 bit multi-value image having been compressed in Step S2709 (capacity of second compressed data) with each other. If the capacity of the 8 bit multi-value image is smaller, the RIP ill discards the binary image (1) having been subjected to the JBIG compression and the difference image having been subjected to the JBIG compression which are stored in the document management section 36 in Step S2708. Then, instead the RIP 111 stores the 8 bit multi-value image having been compressed in Step S2709 into the document management section in a predetermined format. If not so, the RIP 111 associates the compressed binary image (1) and the compressed binary difference image with each other in a predetermined format within the document management section 36 in Step S2720.

Figure 25:
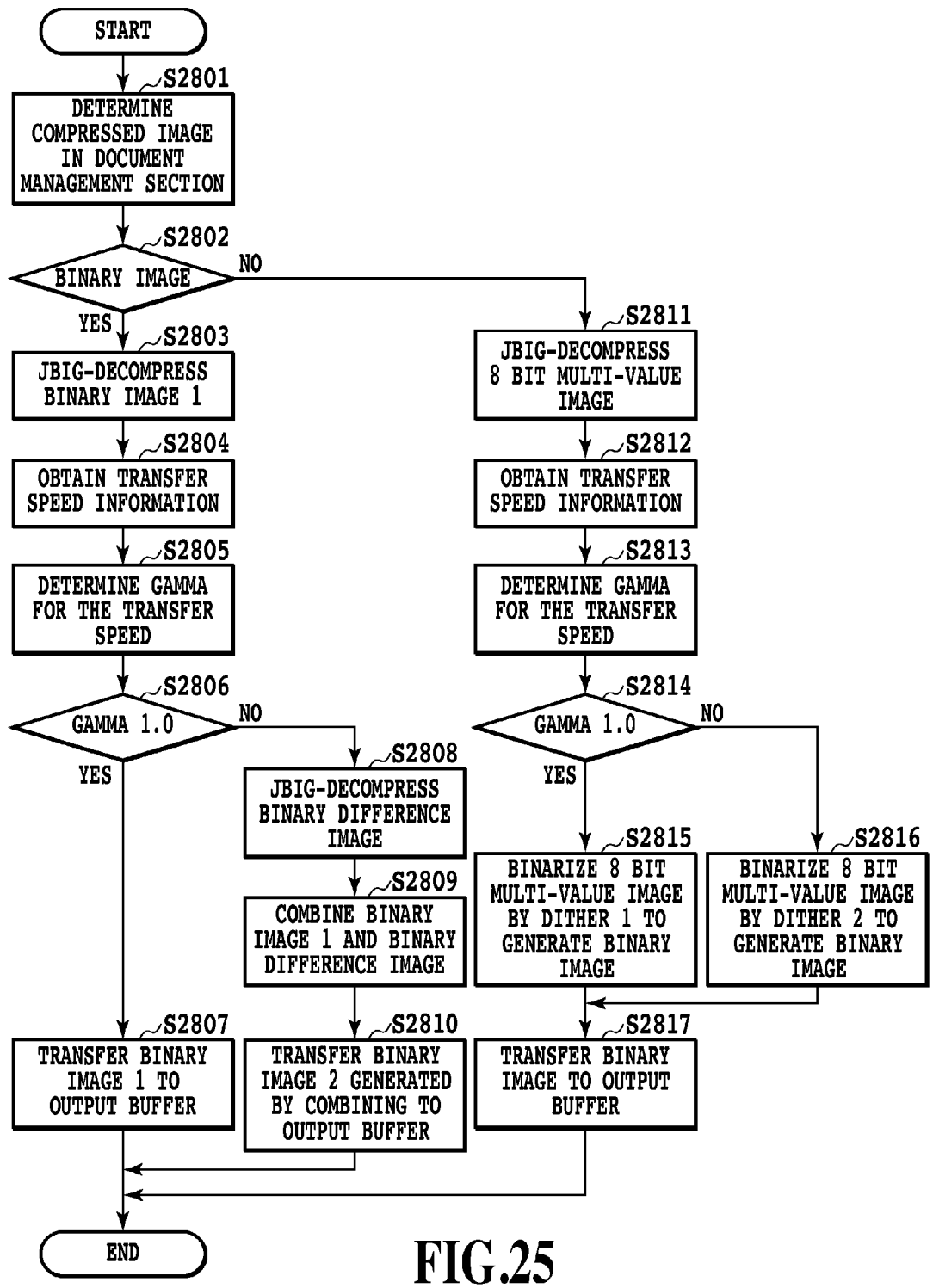
FIG. 25 is a flowchart showing a processing example of a digital multi-functional machine in another embodiment of the present invention.

FIG. 25 is a flowchart showing a processing flow example of the image decompression section 40 in the image data processing operated by the raster image processor (RIP) 111 in the present embodiment. The control of this processing is carried out by the operation that the CPU 101 reads the program stored in the storage section such as the HDD 104 for carrying out the processing shown in FIG. 25 and executes the program.

The difference from FIG. 10 of Embodiment 1 is that a unit is provided for determining whether the image stored in the document management section 36 is the binary image or the multi-value image in Step S2802. Further, the processing from Step S2811 to Step S2817 is added for the case of the multi-value image.

If the image is determined to be the binary image in Step S2802, the processing in Step S2803 and the succeeding steps are carried out. This is the same processing as that in Embodiment 1.

If the image is determined to be the multi-value image, in Step S2811, the RIP 111 obtains the pointer to the compressed 8 bit multi-value image in the document management section 36, performs the JBIG decompression on the compressed 8 bit multi-value image, and stores the decompressed image temporarily in the RAM 102.

Next, in Step S2812, the RIP 111 obtains the paper size information in the page attribute 1111, transfers the paper size information to the print control section 38, and obtains the information of the recording paper used for printing and the information regarding the transfer speed.

In Step S2813, the RIP 111 determines whether the gamma correction is necessary or not, from the above combination of the transfer speed and the gamma value.

In Step S2S814, if the gamma correction is determined not to be necessary, that is, if the binary image is determined to be output in gamma 1.0, the process goes to Step S2815. In Step S2815, the RIP 111 performs the pseudo-halftone processing on the 8 bit multi-value image 5001 using the dither (1) 5002, and obtains the binary image (1) 5004 having the density characteristic of gamma 1.0.

If the output of gamma 1.1 is determined to be necessary in Step S2814, the process goes to Step S2816. In Step S2816, the RIP 111 performs the pseudo-halftone processing on the 8 bit multi-value image 5001 using the dither (2) 5003, and obtains the binary image (2) 5005 having the density characteristic of gamma 1.1. The CPU 101 transfers the binary image (1) 5004 or the binary image (2) 5005 obtained in this manner to the output buffer 39 in Step S2817.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-235197, filed Sep. 12, 2008, which is hereby incorporated by reference herein in its entirety.

What is claimed is:

1. An image processing apparatus, comprising:
   a unit for performing halftone processing on one multi-value image by using a plurality of different kinds of threshold value arrangements and generating a plurality of halftone images which have different density characteristics;
   a unit for generating a difference image between a first halftone image and a halftone image other than the first halftone image among the plurality of generated halftone images;
   a unit for storing the first halftone image and the generated difference image;
   a unit for determining a density characteristic for printing the halftone image;
   a unit for generating a halftone image, when the unit for determining determines to carry out printing with the density characteristic different from that of the stored first halftone image, by combining the stored difference image according to the determined density characteristic and the stored first halftone image; and
   a unit for outputting the combined and generated halftone image for printing.

2. The image processing apparatus according to claim 1, further comprising
   a unit for obtaining a setting value of a recording paper transfer speed in printout of the halftone image,
   wherein the unit for determining the density characteristic determines the density characteristic for printing the halftone image according to the obtained setting value of the recording paper transfer speed.

3. The image processing apparatus according to claim 1, further comprising
   a network I/F connected to a printing apparatus storing the threshold value arrangement via a network,
   wherein the unit for generating the difference image
      obtains a threshold value arrangement from the printing apparatus via the network I/F,
      performs the halftone processing on one multi-value image using a plurality of different threshold value arrangements including the obtained threshold value arrangement, and
      generates a plurality of halftone images which have different density characteristics, and
   wherein the unit for outputting transmits the combined and generated halftone image to the printing apparatus via the network I/F.

4. An image processing method carried out in an image processing apparatus, the method comprising the steps of:
   performing halftone processing on one multi-value image by using different kinds of threshold value arrangements to generate a plurality of halftone images which have different density characteristics;
   generating a difference image between a first halftone image and a halftone image other than the first halftone image among the plurality of generated halftone images;
   storing the first halftone image and the generated difference image;
   determining a density characteristic for printing the halftone image;
   generating a halftone image by combining the stored difference image according to the determined density characteristic and the stored first halftone image when the step of determination determines to carry out printing with the density characteristic different from that of the stored first halftone image; and outputting the combined and generated halftone image for printing.

5. A non-transitory computer-readable storage medium storing an executable program for causing a computer to execute the image processing method according to claim 4.

* * * * *